(12) United States Patent
Atti et al.

(10) Patent No.: US 11,910,344 B2
(45) Date of Patent: *Feb. 20, 2024

(54) CONFERENCE AUDIO MANAGEMENT

(71) Applicant: QUALCOMM Incorporated, San Diego, CA (US)

(72) Inventors: Venkatraman S. Atti, San Diego, CA (US); Daniel J. Sinder, San Diego, CA (US); Nikolai Leung, San Francisco, CA (US); Vivek Rajendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/249,754

(22) Filed: Jan. 16, 2019

(65) Prior Publication Data
US 2019/0150113 A1 May 16, 2019

Related U.S. Application Data

(63) Continuation of application No. 15/083,974, filed on Mar. 29, 2016, now Pat. No. 10,225,814.
(Continued)

(51) Int. Cl.
*H04W 56/00* (2009.01)
*H04L 43/087* (2022.01)
(Continued)

(52) U.S. Cl.
CPC ....... *H04W 56/0045* (2013.01); *H04L 43/087* (2013.01); *H04L 65/65* (2022.05);
(Continued)

(58) Field of Classification Search
CPC . H04W 56/0045; H04W 80/04; H04W 88/02; H04S 7/00; H04S 2420/01;
(Continued)

(56) References Cited

U.S. PATENT DOCUMENTS 5,844,600 A * 12/1998 Kerr ................. H04N 7/152
348/14.09
5,953,049 A * 9/1999 Horn ................. H04N 21/4341
348/E7.083
(Continued)

FOREIGN PATENT DOCUMENTS

CN 101188525 A 5/2008
CN 101902649 A 12/2010
(Continued)

OTHER PUBLICATIONS

3GPP, "3rd Generation Partnership Project; Technical Specification Group Services and System Aspects; Mandatory Speech Codec Speech Processing Functions AMR Speech Codec; Transcoding Functions," 3G TS 26.090; Version 3.0.1, Aug. 1999, pp. 1-61.
(Continued)

*Primary Examiner* — Derrick W Ferris
*Assistant Examiner* — Chuong M Nguyen
(74) *Attorney, Agent, or Firm* — QUALCOMM Incorporated

(57) ABSTRACT

A method for managing audio during a conference includes steering, at a spatial steering processor of a mobile device, first decoded audio to be projected from a speaker at a first angle. The method also includes steering, at the spatial steering processor, second decoded audio to be projected from the speaker at a second angle. The first decoded audio corresponds to a decoded version of a first audio stream from a first device associated with a first participant of the conference, and the second decoded audio corresponds to a decoded version of a second audio stream from a second device associated with a second participant of the conference. The first decoded audio is synchronized with the second decoded audio.

26 Claims, 10 Drawing Sheets

Related U.S. Application Data

(60) Provisional application No. 62/144,033, filed on Apr. 7, 2015, provisional application No. 62/143,154, filed on Apr. 5, 2015.

(51) Int. Cl.
| | |
|---|---|
| *H04M 3/56* | (2006.01) |
| *H04S 7/00* | (2006.01) |
| *H04R 29/00* | (2006.01) |
| *H04L 65/65* | (2022.01) |
| *H04W 88/02* | (2009.01) |
| *H04W 80/04* | (2009.01) |

(52) U.S. Cl.
CPC ........... *H04M 3/562* (2013.01); *H04M 3/568* (2013.01); *H04R 29/007* (2013.01); *H04S 7/00* (2013.01); *H04S 2420/01* (2013.01); *H04W 80/04* (2013.01); *H04W 88/02* (2013.01)

(58) Field of Classification Search
CPC ..... H04M 3/568; H04M 3/562; H04L 43/087; H04L 65/608
See application file for complete search history.

(56) References Cited

U.S. PATENT DOCUMENTS

| | | | |
|---|---|---|---|
| 6,704,281 B1 * | 3/2004 | Hourunranta | H04N 7/52 370/465 |
| 6,850,496 B1 * | 2/2005 | Knappe | H04L 65/403 370/266 |
| 7,394,833 B2 * | 7/2008 | Heikkinen | G10L 21/04 704/E19.048 |
| 7,720,212 B1 * | 5/2010 | Jouppi | H04M 3/56 709/204 |
| 8,718,301 B1 | 5/2014 | Jouppi et al. | |
| 9,060,094 B2 * | 6/2015 | Thapa | H04L 65/1093 |
| 10,225,814 B2 * | 3/2019 | Atti | H04S 7/00 |
| 2001/0014853 A1 | 8/2001 | Ishii | |
| 2002/0196947 A1 * | 12/2002 | Lapicque | H04S 1/002 381/17 |
| 2003/0053612 A1 * | 3/2003 | Henrikson | H04L 12/1818 379/202.01 |
| 2003/0081751 A1 * | 5/2003 | Berstis | H04M 3/569 379/202.01 |
| 2004/0042601 A1 | 3/2004 | Miao | |
| 2004/0047461 A1 * | 3/2004 | Weisman | H04M 3/567 379/202.01 |
| 2004/0052218 A1 * | 3/2004 | Knappe | H04M 3/42187 370/266 |
| 2004/0156397 A1 | 8/2004 | Heikkinen et al. | |
| 2005/0054287 A1 * | 3/2005 | Kim | H04L 51/58 455/3.05 |
| 2005/0147261 A1 * | 7/2005 | Yeh | H04R 3/12 381/26 |
| 2007/0263985 A1 * | 11/2007 | Ikeda | G11B 27/322 386/353 |
| 2008/0187143 A1 * | 8/2008 | Mak-Fan | H04R 5/027 381/17 |
| 2008/0243278 A1 * | 10/2008 | Dalton | H04S 7/304 704/E21.003 |
| 2009/0088880 A1 * | 4/2009 | Thapa | H04L 65/403 709/204 |
| 2009/0116652 A1 * | 5/2009 | Kirkeby | H04S 7/303 381/1 |
| 2009/0220100 A1 * | 9/2009 | Ohta | G10K 15/08 381/63 |
| 2009/0299739 A1 * | 12/2009 | Chan | H04R 3/005 704/225 |
| 2010/0145711 A1 * | 6/2010 | Oh | G10L 19/008 704/500 |
| 2011/0051940 A1 * | 3/2011 | Ishikawa | H04L 12/40013 381/22 |
| 2011/0135098 A1 * | 6/2011 | Kuhr | H04S 7/304 381/17 |
| 2012/0206564 A1 | 8/2012 | Potekhin et al. | |
| 2013/0022189 A1 | 1/2013 | Ganong, III et al. | |
| 2013/0188482 A1 * | 7/2013 | Lee | H04L 47/25 370/235 |
| 2014/0032649 A1 * | 1/2014 | Saedy | G06Q 10/101 709/203 |
| 2014/0173467 A1 * | 6/2014 | Clavel | H04L 12/1822 715/758 |
| 2015/0003647 A1 * | 1/2015 | Chen | H04S 1/00 381/300 |
| 2015/0049868 A1 * | 2/2015 | Boustead | H04M 3/568 379/202.01 |
| 2015/0078594 A1 * | 3/2015 | Mcgrath | H04S 3/002 381/300 |
| 2015/0296086 A1 * | 10/2015 | Eckert | H04S 5/00 381/17 |
| 2016/0105473 A1 * | 4/2016 | Klingbeil | H04L 47/283 370/260 |
| 2016/0142851 A1 * | 5/2016 | Sun | H04S 3/02 381/20 |
| 2016/0266865 A1 | 9/2016 | Tsingos et al. | |
| 2016/0295539 A1 | 10/2016 | Atti et al. | |

FOREIGN PATENT DOCUMENTS

| | | |
|---|---|---|
| CN | 102171750 A | 8/2011 |
| CN | 102971788 A | 3/2013 |
| CN | 103237191 A | 8/2013 |
| CN | 103474076 A | 12/2013 |
| CN | 104244164 A | 12/2014 |
| CN | 104269182 A | 1/2015 |
| EP | 1954019 A1 | 8/2008 |
| EP | 2160005 A1 | 3/2010 |
| JP | 2005151044 A | 6/2005 |
| JP | 2005318535 A | 11/2005 |
| JP | 2005354351 A | 12/2005 |
| JP | 2006254064 A | 9/2006 |
| JP | 2006279492 A | 10/2006 |
| JP | 2006319779 A | 11/2006 |
| TW | 201347507 A | 11/2013 |
| WO | 2009045971 A1 | 4/2009 |
| WO | 2014204999 A2 | 12/2014 |
| WO | WO-2016003776 A2 * | 1/2016 ............... H04R 5/04 |

OTHER PUBLICATIONS

International Preliminary Report on Patentability—PCT/US2016/025058, The International Bureau of WIPO—Geneva, Switzerland, dated Oct. 19, 2017.
International Search Report and Written Opinion—PCT/US2016/025058—ISA/EPO—dated Jun. 21, 2016.
European Search Report—EP19157865—Search Authority—The Hague—dated May 27, 2019.
Taiwan Search Report—TW105110641—TIPO—dated Apr. 9, 2020.

* cited by examiner

CONFERENCE AUDIO MANAGEMENT

I. CLAIM OF PRIORITY

The present application claims priority from and is a continuation application of U.S. patent application Ser. No. 15/083,974, filed Mar. 29, 2016 and entitled "CONFERENCE AUDIO MANAGEMENT," which claims priority from U.S. Provisional Patent Application No. 62/143,154, filed Apr. 5, 2015 and entitled "CONFERENCE AUDIO MANAGEMENT AT A MOBILE DEVICE", and from U.S. Provisional Patent Application No. 62/144,033, filed Apr. 7, 2015 and entitled "CONFERENCE AUDIO MANAGEMENT", the contents of each of which is incorporated by reference in its entirety.

II. FIELD

The present disclosure is generally related to conference audio management.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player.

Three or more participants associated with three or more corresponding wireless devices may use a "conference call" to communicate with one another. During the conference call, a first wireless device may receive a "mixed audio stream" from a network mixer. For example, the network mixer may receive audio streams from each participant of the conference call. After receiving the audio streams, the network mixer may mix an audio stream from a second wireless device with an audio stream from a third wireless device to generate a mixed audio stream to provide the first wireless device. To generate the mixed audio stream, the network mixer decodes each incoming audio stream, mixes the decoded audio streams, and re-encodes the mixed decoded audio streams. However, audio processing associated with generating the mixed audio stream may introduce a delay. Additionally, because conference participants receive a mixed audio stream from a central network mixer, it may not be possible to adjust participant audio individually. For example, if parties A, B, and C are in a conference, party A may be unable to emphasize party B's speech over party C's speech using gain adjustment or spatial processing techniques, because the network mixer provides party A single mixed stream that includes speech from both party B and party C.

IV. SUMMARY

Systems and methods for managing audio during a conference are disclosed. According to a particular implementation, to enable adjustment of audio from individual conference participants, a network mixer may relay individual audio streams to participants instead of generating a mixed stream. For example, in a three-party conference, party A may receive separate audio streams from party B and party C, respectively. However, due to variance in network conditions, the streams from party B and party C may not be synchronized with each other, which may lead to temporally erroneous output party A's device. To illustrate, if party B's stream is delayed, party A may hear a question posed by party B after hearing an answer to that question by party C.

In accordance with techniques described herein, a mobile device may use buffer management to synchronize streams received from different devices. For example, a first audio stream from a first conference participant may be provided to a first buffer (e.g., de-jitter buffer) of the mobile device, and a second audio stream from a second conference participant may be provided to a second buffer of the mobile device. Upon receiving the first and second audio streams, a delay controller may compare time stamps of the first audio stream with time stamps of the second audio stream to synchronize audio from the first conference participant with audio from the second conference participant. Synchronizing of the audio may satisfy Third Generation Partnership Project (3GPP) Technical Specification (TS) 26.114 delay requirements during the conference. For example, the delay controller may provide a control signal to the first and second buffers based on the time stamps such that the first buffer outputs Real-Time Transfer Protocol (RTP) packets of the first audio stream at approximately the same time the second buffer outputs corresponding RTP packets of the second audio stream.

After synchronization, the first audio stream and the second audio stream may be separately decoded to generate first decoded audio and second decoded audio, respectively. The first and second decoded audio may be mixed to generate an output audio stream at the mobile device. In some implementations, a first head-related transfer function (HRTF) may be applied to the first decoded audio to adjust a first gain of the first decoded audio and to spatially steer (e.g., pan) the first decoded audio based on user-defined settings. Additionally, a second HRTF may be applied to the second decoded audio to adjust a second gain of the second decoded audio and to spatially steer the second decoded audio based on user-defined settings. Thus, providing the first and second audio streams to the mobile device (as opposed to mixing the audio streams at a network mixer and providing a resulting mixed audio stream to the mobile device) may enable the mobile device may be able to control characteristics (e.g., gain characteristics and spatial panning characteristics) of individual audio streams. In particular, audio panning may enable the rendering device to choose to vary or adjust the audio levels of the participants by adjusting the mixing gains. Further, audio spatialization may enable the rendering device to choose different HRTF functions to spatially distribute (e.g., virtual seating) the participants, which may improve talker/word discrimination and better understanding in case of simultaneous talkers. Additionally, a delay associated with mixing audio streams at the network mixer may be reduced (e.g., eliminated).

According to one example of the techniques described herein, a method for managing audio during a conference includes receiving, at a first buffer of a mobile device, a first audio stream from a first device associated with a first participant of the conference. The method also includes receiving, at a second buffer of the mobile device, a second audio stream from a second device associated with a second participant of the conference. The method further includes generating a control signal at a delay controller of the mobile device. The control signal is provided to the first buffer and to the second buffer to synchronize first buffered audio that is output from the first buffer with second buffered audio that is output from the second buffer.

According to another example of the techniques described herein, a mobile device includes a first buffer configured to receive a first audio stream from a first device associated with a first participant of a conference. The mobile device also includes a second buffer configured to receive a second audio stream from a second device associated with a second participant of the conference. The mobile device further includes a delay controller configured to generate a control signal. The control signal is provided to the first buffer and to the second buffer to synchronize first buffered audio that is output from the first buffer with second buffered audio that is output from the second buffer.

According to another example of the techniques described herein, a non-transitory computer-readable medium includes instructions for managing audio during a conference. The instructions, when executed by a processor in a mobile device, cause the processor to perform operations. The operations include receiving, at a first buffer, a first audio stream from a first device associated with a first participant of the conference. The operations further include receiving, at a second buffer, a second audio stream from a second device associated with a second participant of the conference. The operations also include generating a control signal at a delay controller. The control signal is provided to the first buffer and to the second buffer to synchronize first buffered audio that is output from the first buffer with second buffered audio that is output from the second buffer.

According to another example of the techniques described herein, an apparatus includes means for receiving a first audio stream form a first device associated with a first participant of a conference. The apparatus also includes means for receiving a second audio stream from a second device associated with a second participant of the conference. The apparatus further includes means for generating a control signal. The control signal is provided to the means for receiving the first audio stream and to the means for receiving the second audio stream to synchronize first buffered audio that is output from the mean for receiving the first audio stream with second buffered audio that is output from the means for receiving the second audio stream.

Particular advantages provided by at least one of the disclosed implementations include reducing a delay associated with mixing multiple audio streams in a conference at a network mixer. For example, bypassing audio mixing at the network mixer may improve (e.g., reduce) delay during the conference. Other implementations, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Particular techniques of the present disclosure are described with reference to the drawings. In the description, common features are designated by common reference numbers throughout the drawings.

Figure 1A:
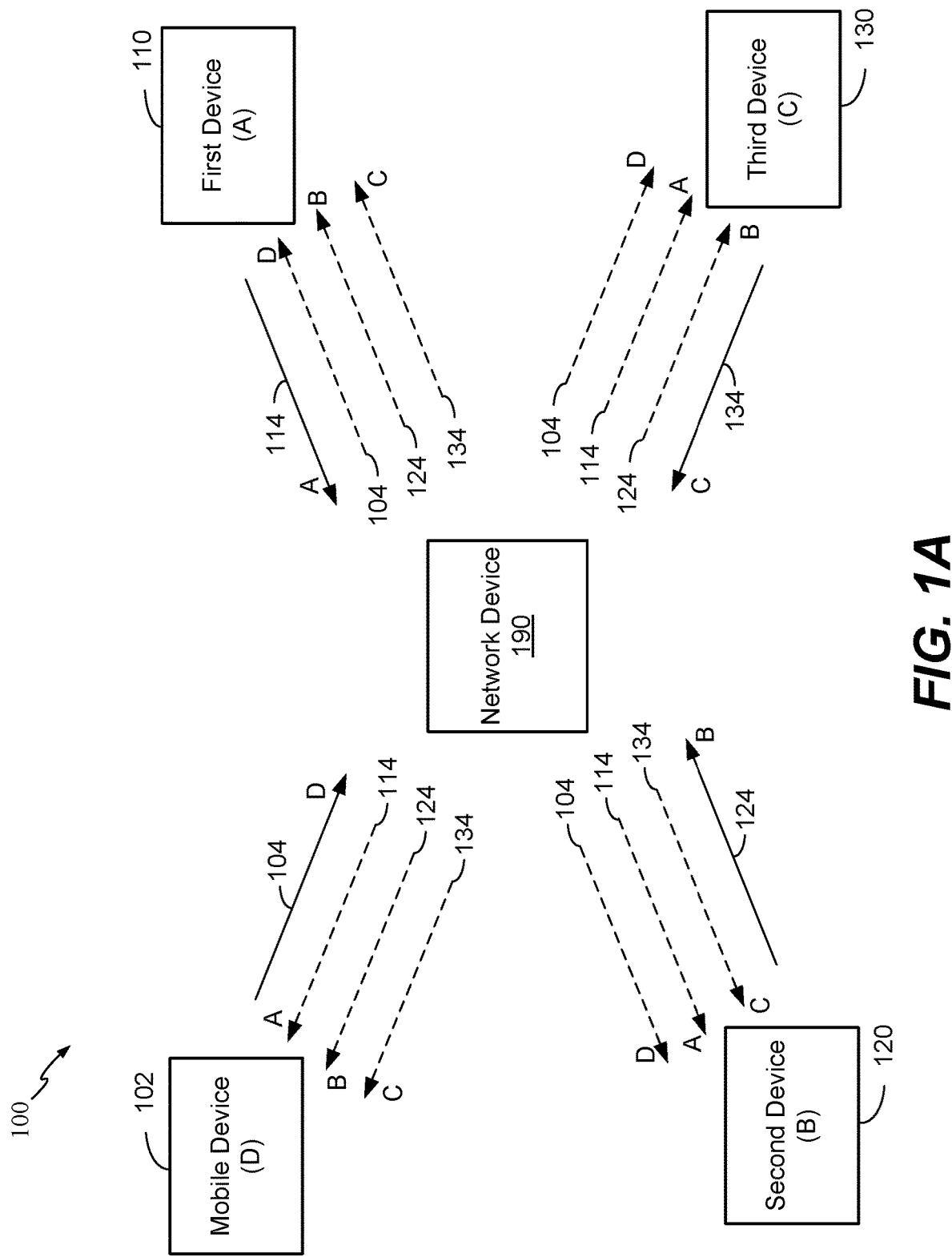
FIG. 1A is a diagram illustrating a system that is operable to manage audio during a conference.

Referring to FIG. 1A, a particular implementation of a system 100 that is operable to manage audio during a conference is shown. The system 100 includes a mobile device 102, a first device 110, a second device 120, a third device 130, and a network device 190. In one example, the mobile device 102, the first device 110, the second device 120, and the third device 130 may each include a user equipment (UE) that is compatible with a Third Generation Partnership Project (3GPP) standard. Although a four-party conference is illustrated in FIG. 1A, it is to be understood that in alternative implementations, more or fewer than four parties may participate in a conference.

The mobile device 102, the first device 110, the second device 120, and the third device 130 may be participating in a conference (e.g., an audio conference call). The network device 190 may be configured route audio (e.g., audio streams) from one device to each other device connected to the conference call.

To illustrate, the mobile device 102 may be configured to generate an audio stream 104 that is encoded at the mobile device 102. The audio stream 104 may include speech (e.g., user speech) and/or background noise. The audio stream 104 may be provided to the network device 190, and the network device 190 may route the audio stream 104 (or a transcoded/processed version thereof) to the other devices 110, 120, 130. The first device 110 may be configured to generate a first audio stream 114 that is encoded at the first device 110. The first audio stream 114 may include speech from a first participant of the conference (e.g., a user of the first device 110) and/or background noise at the first device 110. The first audio stream 114 may be provided to the network device 190, and the network device 190 may route the first audio stream 114 (or a transcoded/processed version thereof) to the other devices 102, 120, 130. The second device 120 may be configured to generate a second audio stream 124 that is encoded at the second device 120. The second audio stream 124 may include speech from a second participant of the conference (e.g., a user of the second device 120) and/or background noise at the second device 120. The second audio stream 124 may be provided to the network device 190, and the network device 190 may route the second audio stream 124 (or a transcoded/processed version thereof) to the other devices 102, 110, 130. The third device 130 may be configured to generate a third audio stream 134 that is encoded at the third device 130. The third audio stream 134 may include speech from a third participant of the conference (e.g., a user of the third device 130) and/or background noise at the third device 130. The third audio stream 134 may be provided to the network device 190, and the network device 190 may route the third audio stream 134 (or a transcoded/processed version thereof) to the other devices 102, 110, 120.

Although each audio stream 104, 114, 124, 134 is described as including speech from a particular user/participant of the conference, in other examples, one or more audio streams 104, 114, 124, 134 may include speech from multiple participants of the conference. For example, two or more of devices may be in a relatively close vicinity of one another and may "pick up" speech from multiple participants of the conference. Additionally, or in the alternative, audio streams may include speech from multiple conference participants associated with a single user equipment (e.g., a single mobile device). For example, multiple conference participants may speak into a single mobile (or fixed) device, and the mobile (or fixed) device may generate an audio stream that includes speech from the multiple conference participants. To illustrate, the first audio stream 114 may be a single audio stream that includes speech from multiples speakers. For example, if four people are speaking into the first device 110, the first audio stream 114 may be a mono audio stream, a stereo audio stream, a 4-channel audio stream (e.g., one channel per speaker), etc.

As described above, the network device 190 may route the encoded audio streams 114, 124, 134 from the devices 110, 120, 130, respectively, to the mobile device 102. According to the techniques described herein, the mobile device 102 may perform audio mixing such that audio mixing is bypassed at the network device 190. Audio mixing at the mobile device 102 is described in greater detail with respect to FIG. 2A. Thus, instead of decoding the audio streams 114, 124, 134, mixing the decoded audio streams to generate a mixed audio stream, re-encoding the mixed audio stream to generate a re-encoded audio stream, and providing the re-encoded audio stream to the mobile device 102, the network device 190 may route each encoded audio stream 114, 124, 134 to the mobile device 102.

According to one example, the network device 190 may operate as a "master switch" to perform signaling activities between the other devices 102, 110, 120, 130. For example, the network device 190 may receive the audio streams 104, 114, 124, 134 from the devices 102, 110, 120, 130, respectively, and may negotiate bit rate controls associated with relaying the audio streams 104, 114, 124, 134. Upon receiving the audio streams, the network device 190 may negotiate bit rates at which particular audio streams are routed to particular devices. As an illustrative non-limiting example, the network device 190 may negotiate (with the mobile device 102) a first bit rate at which the first audio stream 114 is provided to the mobile device 102, a second bit rate at which the second audio stream 124 is provided to the mobile device 102, and a third bit rate at which the third audio stream 134 is provided to the mobile device 102. The network device 190 may also be able to negotiate bandwidths (e.g., uplink bandwidths and downlink bandwidths) at which signals (e.g., audio streams) may be communicated based on individual device capabilities. For example, based on coder/decoder (CODEC) capabilities of each device 102, 110, 120, 130, the network device 190 may be able to negotiate a bandwidth at which audio streams are provided to a particular device.

Bypassing audio mixing at the network device 190 and performing audio mixing at the individual devices 102, 110, 120, and 130 may reduce quality degradations that may otherwise be associated with an audio processing chain at the network device 190. For example, audio quality degradations due to decoding operations at the network device 190, mixing operations at the network device 190, and re-encoding operations at the network device 190 may be reduced. Thus, by performing audio mixing at the individual devices 102, 110, 120, and 130 (as opposed to the network device 190), tandem coding operations and transcoding operations may be bypassed. Additionally, the loss of binaural perception may be reduced. For example, if the first audio stream 114 is a stereo audio stream and the other audio streams 124, 134 are mono audio streams, the mobile device 102 may preserve the stereo qualities of the first audio stream 114 if individual audio streams 114, 124, 134 are sent to the mobile device 102. However, performing audio mixing (e.g., decoding, mixing, and re-encoding) at the network device 190 and providing a mixed audio stream to the mobile device 102 may increase the likelihood that the stereo qualities of the first audio stream 114 will be "lost." For example, there may be no guarantee that the network device 190 will preserve the stereo qualities of the first audio stream 114 during audio mixing.

Additionally, bypassing audio mixing at the network device 190 may reduce delay in an audio processing chain (e.g., a transcoding chain). For example, performing audio mixing at the network device 190 may require the network device 190 to support de-jitter buffers that add delay to the audio processing chain. Multiple re-encodings may also be avoided by bypassing audio mixing at the network device 190. For example, to generate a mixed stream for the mobile device 102, the network device 190 may re-encode a mixed audio stream that includes (or is generated from) the audio streams 114, 124, 134. As another example, to generate a mixed stream for the first device 110, the network device 190 may re-encode a mixed audio stream that includes (or is generated from) the audio streams 104, 124, 134. Similar re-encoding operations may be performed to provide mixed audio to the other devices 120, 130. The system 100 may avoid such re-encoding operations by bypassing audio mixing at the network device 190.

In particular implementations, as described with respect to FIGS. 2A-4, the mobile device 102 may apply personalized head-related transfer functions (HRTFs) to the audio streams 114, 124, 134. Thus, spatial steering may be performed using the HRTFs to enable multi-channel audio (e.g., left channel audio, right channel audio, or a combination thereof) that exceeds "traditional" stereo audio capabilities. Further, as described with respect to FIGS. 2A and 4, bypassing audio mixing at the network device 190 may enable spatial steering based on head-tracking features at the mobile device 102. In a scenario where the conference includes audio streams and video streams, bypassing audio mixing at the network device 190 may also enable the mobile device 102 to synchronize audio and video if the video is not transcoded at a network device, such as the network device 190.

In a particular implementation, the described systems and methods may support audio/video synchronization for conferencing, which may be performed using a variety of techniques. According to one example of audio/video synchronization, audio streams and corresponding video streams may be transcoded at the network device 190. According to another example of audio/video synchronization, video streams from each device 102, 110, 120, 130 may be relayed to other devices within the system 100 by the network device 190, and the audio streams 104, 114, 124, 134 from each device 102, 110, 120, 130 may be transcoded at the network device 190 to generate mixed audio streams. For example, the network device 190 may generate a mixed audio stream that includes (or that is generated from) the audio streams 114, 124, 134 and may send the mixed audio stream to the mobile device 102. The individual video streams (associated with the devices 110, 120, 130) relayed to mobile device 102 may include RTP packets having time stamps generated from the devices 110, 120, 130 because the network device 190 bypasses transcoding operations on the video streams. However, the mixed audio stream may have a different time stamp than the time stamps of the video streams due to transcoding operations at the network device 190. The mobile device 120 may determine (e.g., track) the delay between the time stamps of the video streams and the time stamp of the mixed audio stream. After determining the delay, the mobile device 102 may adjust the mixed audio stream and/or the video streams to synchronize the audio and video.

According to another example of audio/video synchronization, video streams from each device 102, 110, 120, 130 may be relayed to other devices within the system 100 by the network device 190, and the audio streams 104, 114, 124, 134 from each device 102, 110, 120, 130 may also be relayed to other devices within the system 100 by the network device 190. According to this example, transcoding operations for audio and video are bypassed at the network device 190. Because the video streams and the audio streams 104, 114, 124, 134 are sent in separate RTP packets, there may be drift (e.g., a delay) between an RTP video packet and a corresponding RTP audio packet. For example, an RTP audio packet of the first audio stream 114 and a corresponding RTP video packet from the first device 110 may have different time stamps. Upon receiving the RTP audio packet and the corresponding RTP video packet, the mobile device 102 may synchronize the RTP audio packet and the corresponding RTP video packet.

According to the techniques described herein, the mobile device 102 may be able to "negotiate" (e.g., adjust or perform session description protocol (SDP) negotiations) a bit rate and/or a bandwidth of each audio stream 114, 124, 134 provided to the mobile device 102 during the conference based on user-defined settings, hardware capabilities of the mobile device 102, or a combination thereof. To illustrate, the mobile device 102 may provide a first signal (not shown) to the network device 190 to adjust a first bit rate at which the first audio stream 114 is provided to the mobile device 102, provide a second signal (not shown) to the network device 190 to adjust a second bit rate at which the second audio stream 124 is provided to the mobile device 102, and/or provide a third signal (not shown) to the network device 190 to adjust a third bit rate at which the third audio stream 134 is provided to the mobile device 102. As an illustrative non-limiting example, the mobile device 102 may send the network device 190 signals indicating that a user of the mobile device 102 prefers higher quality (e.g., greater bandwidth) for the first audio stream 114 than the other audio streams 124, 134 (e.g., to emphasize speech from conference participant that is using the first device 110).

According to another implementation, each device in the system 100 may negotiate bit rates and/or bandwidths "directly" with other devices in the system 100 (e.g., bypassing negotiations at the network device 190). As a non-limiting example, the mobile device 102 may negotiate directly with the first device 110 to adjust the first bit rate at which the first audio stream 114 is provided to the mobile device 102. According to this non-limiting example, the network device 190 may operate as a "managing device" and may monitor the bit rates at which incoming audio streams 104, 114, 124, 134 are being received. However, negotiations are performed at the devices 102, 110, 120, 130 as opposed to at the network device 190.

In a particular scenario, the network device 190 may operate as a "packet bundler" and may bundle RTP packets for a particular device in the system 100. To illustrate, the network device 190 may bundle (e.g., packets of) the audio stream 104, the second audio stream 124, and the third audio stream 134 into a "bundled packet" that is to be provided to the first device 110. The network device 190 may insert an RTP header in the bundled packet and may send the bundled packet to the first device 110. According to this scenario, the first device 110 may utilize a single de-jitter buffer to process the stream of bundled (RTP) packets received from the network device 190. The network device 190 may assign device identifiers (IDs) in the bundled packet to instruct processing elements within the first device 110 as to which audio stream 104, 124, 134 is associated with each device 102, 120, 130. For example, each packet within a bundle may include an identifier of which device the packet was generated by. In a particular implementation, the packets within a bundle may include their own time stamps. The bundle as a whole may or may not include a time stamp. Thus, in particular implementations, de-jitter buffer management may include utilizing intra-stream time stamps as well as inter-stream timestamps, as further described with reference to FIG. 2A.

In one example, the bandwidth at the mobile device 102 to receive the audio streams 114, 124, 134 may be dependent on a number of active speakers at a given time. For example, based on hardware capabilities of the mobile device 102 (e.g., bandwidth limitations), the mobile device 102 may have a bandwidth limit for receiving and processing audio from the network device 190. As the number of active speakers at a given time increases, the available resource (e.g., hardware) bandwidth at the mobile device 102 may decrease.

To alleviate bandwidth limitations, the conference may "self-regulate" to reduce the number of active speakers at a given time. Typically, there are not many active speakers at the same time; otherwise, the conference conversation may become increasingly difficult to follow. If a participant at a particular device is not speaking at a given time, data frames in the corresponding audio stream generated by that device may include discontinued transmission (DTX) data frames and may have a relatively low bit rate (e.g., approximately 0.3 kilobits per second (kbps)) indicative of background noise characteristics. For example, if the first participant at the first device 110 is silent at the given time, the average data rate of the first audio stream 114 may be approximately 0.3 kbps, based on sending a 2.4 kbps frame every 8 frames (e.g., 2.4 kbps/8=0.3 kbps).

Assume that an active speaker has an uplink bit rate 13.2 kbps according to a protocol's signal indicator (SID) with a frequency of every 8 frames. In one non-limiting example, the protocol may be an Enhanced Voice Services (EVS) protocol. When there is one active speaker (e.g., the first participant at the first device 110), the average uplink bit rate for first device 110 may be 13.2 kbps, and the average uplink bit rates for each of the other devices 102, 120, 130 may be 0.3 kbps (e.g., the DTX bit rate). Thus, the average total uplink network bandwidth may be approximately 13.2+0.3+0.3+0.3=14.1 kbps. When the audio mixing is performed at the participant devices (as opposed to at the network device 190), the downlink bit rate to the mobile device 102 is 13.8 kbps, the average downlink bit rate to the first device 110 is 0.9 kbps, the average downlink bit rate to the second device 120 is 13.8 kbps, and the average downlink bit rate to the third device 130 is 13.8 kbps. Thus, the average total downlink bit rate may be approximately 42.3 kbps. The average total downlink bit rate may be less than an average total downlink bit rate when mixing is performed at the network device 190.

When two participants in the conference are speaking at a given time, each active speaker may have an average uplink bit rate of 13.2 kbps. If the first participant at the first device 110 and the second participant at the second device 120 are speaking at the given time, the average uplink bit rate for the first device 110 may be 13.2 kbps and the average uplink bit rate for the second device 120 may be 13.2 kbps. The average uplink bit rates for each of the other devices 102, 130 may be 0.3 kbps (e.g., the DTX bit rate). Thus, the average total uplink network bandwidth may be approximately 27 kbps. When the audio mixing is performed at the participant devices (as opposed to at the network device 190), the average downlink bit rate to the mobile device 102 is 26.7 kbps, the average downlink bit rate to the first device 110 is 13.8 kbps, the average downlink bit rate to the second device 120 is 13.8 kbps, and the average downlink bit rate to the third device 130 is 26.7 kbps. Thus, the average total downlink bit rate may be approximately 82 kbps. The average total downlink bit rate may be less than an average total downlink bit rate when mixing is performed at the network device 190.

As described above, in addition to the "self-regulating" nature of the conference, the mobile device 102 may send signals to the network device 190 to reduce the downlink bandwidth based on user-defined settings. As a non-limiting example, if the user of the mobile device 102 does not want to hear what the first participant of the first device 110 has to say, the user may signal the network device 190 to provide the first audio stream 114 at a lower bit rate (e.g., a "next" reduced active frame coding rate, such as 9.6 kbps as an illustrative non-limiting example) to reduce constraints on a bandwidth limitation at the mobile device 102. In particular, this implicit floor control for audio can be based on settings and signaling from the rendering device to the network device. For example, the multi-stream client in the mobile device may be allowed to receive more audio streams than it is capable of decoding concurrently at a given time. In such a case, the multi-stream client in terminal may have means for choosing which streams to prioritize and which ones to ignore. This selection can be made on which streams are not in DTX mode. Media streams may also be prioritized based on the active level or volume of the audio stream. However, this requires decoding of the media from each stream to determine the loudest stream. Alternatively, a subset of media streams may be decoded periodically and long-term statistics of the active level and frame energy per media stream may be used a-priori to decide which audio streams to decode. The prioritized streams may further be spatially mixed for rendering.

Because audio mixing is performed at the mobile device 102 as opposed to at the network device 190, the mobile device 102 may be configured to synchronize audio from each received audio stream 114, 124, 134 to preserve the overall audio quality of the conference. Such synchronization operations may be used to compensate varying amounts of delay in receiving the audio streams 114, 124, 134 (e.g., due to different network conditions for the different audio streams). As described in greater detail with respect to FIG. 2A, the mobile device 102 may include a "delay controller" that is configured to generate a control signal to synchronize the audio received from each received audio stream 114, 124, 134. For example, the delay controller may operate so that an average delay for each de-jitter buffer (in the mobile device 102) that receives a corresponding audio stream 114, 124, 134 is substantially the same in order to satisfy a frame error rate (FER). As a non-limiting example, the delay controller may ensure that average delay for each de-jitter buffer is 3 frames, 5 frames, 7 frames, etc.

The system 100 of FIG. 1A may reduce quality degradations that may otherwise be associated with an audio processing chain at the network device 190 by performing audio processing (e.g., mixing) at the mobile device 102 (and similarly at the devices 110, 120, 130). For example, audio quality degradations due to decoding operations at the network device 190, mixing operations at the network device 190, and re-encoding operations at the network device 190 may be reduced. Thus, by performing audio mixing at the individual devices 102, 110, 120, 130, transcoding operations may be bypassed.

Figure 1B:
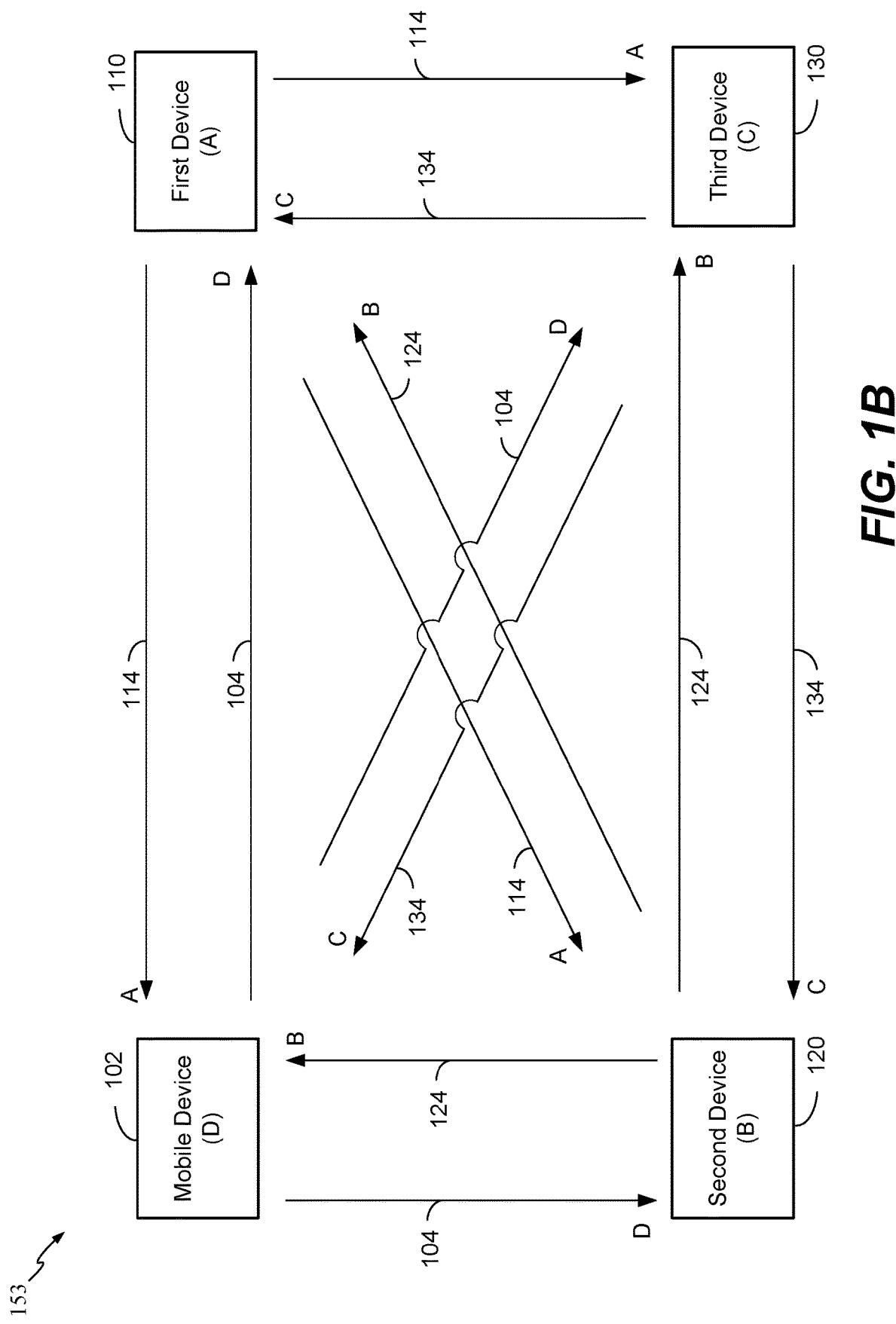
FIG. 1B is a diagram illustrating another system that is operable to manage audio during a conference.

Referring to FIG. 1B, a particular implementation of another system 153 that is operable to manage audio during a conference is shown. The system 153 includes the mobile device 102, the first device 110, the second device 120, and the third device 130.

The system 150 may operate in a substantially similar manner as the system 100 of FIG. 1A; however, the audio streams 104, 114, 124, 134 in the system 153 may be routed from device to device without a central networking system (e.g., the network device 190 of FIG. 1A). Thus, a delay associated with routing at the network device 190 may be reduced in the system 153 of FIG. 1B.

Figure 1C:
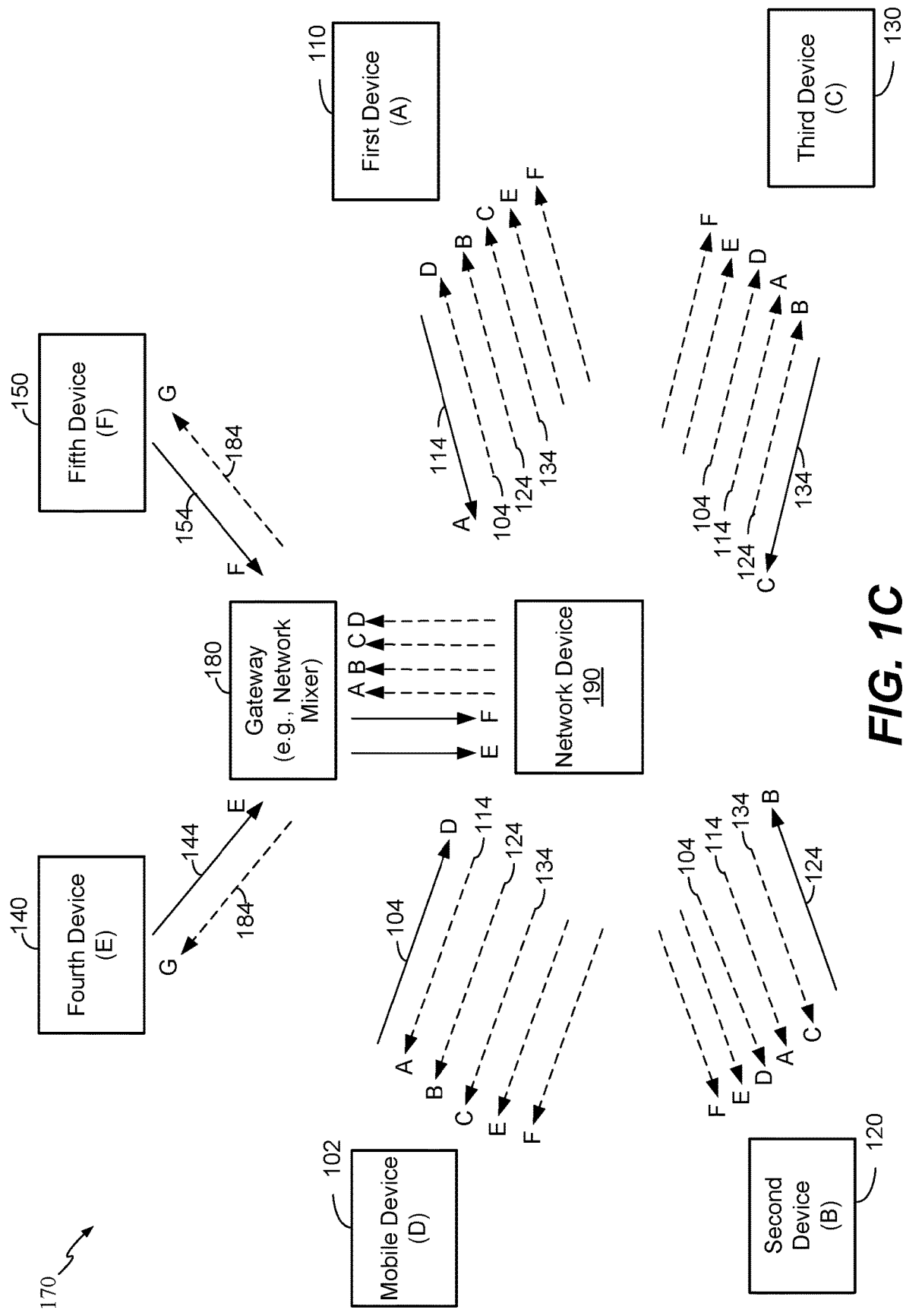
FIG. 1C is a diagram illustrating another system that is operable to manage audio during a conference.

Referring to FIG. 1C, a particular implementation of another system 170 that is operable to manage audio during a conference is shown. The system 170 includes the mobile device 102, the first device 110, the second device 120, the third device 130, a fourth device 140, a fifth device 150, and a gateway 180 (e.g., a network mixer). According to one implementation, the gateway 180 may be a mobile device. According to another implementation, the gateway 180 may be a fixed device.

In the illustration of FIG. 1C, the fourth device 140 and the fifth device 150 are legacy devices. For example, the legacy devices 140, 150 may not be able to perform audio mixing of multiple audio streams in the manner described in FIGS. 1A-1B with respect to the other devices 102, 110, 120, 130 (e.g., due to resource constraints at the legacy devices 140, 150). Rather, the legacy devices 140, 150 may be configured to receive a single audio stream (e.g., a mixed audio stream 184) that includes (or is generated from) the audio streams 104, 114, 124, 134 of the other devices. To illustrate, the network device 190 may relay the audio streams 104, 114, 124, 134 to the gateway 180. The gateway 180 may perform audio mixing on the audio streams 104, 114, 124, 134 to generate the mixed audio stream 184. After generating the mixed audio stream 184, the gateway 180 may relay the mixed audio stream 184 to the fourth device 140 and to the fifth device 150.

The fourth device 140 may be configured to generate a fourth audio stream 144 that is encoded at the fourth device 140. The fourth audio stream 144 may include speech (e.g., user speech) and/or background noise. The fourth audio stream 144 may be provided to the gateway 180, the gateway 180 may route the fourth audio stream 144 (or a transcoded/processed version thereof) to the network device 190, and the network device 190 may route the fourth audio stream 144 (or a transcoded/processed version thereof) to the other devices 102, 110, 120, 130. The fifth device 150 may be configured to generate a fifth audio stream 154 that is encoded at the fifth device 150. The fifth audio stream 154 may include speech (e.g., user speech) and/or background noise. The fifth audio stream 154 may be provided to the gateway 180, the gateway 180 may route the fifth audio stream 154 (or a transcoded/processed version thereof) to the network device 190, and the network device 190 may route the fifth audio stream 154 (or a transcoded/processed version thereof) to the other devices 102, 110, 120, 130.

Although FIG. 1C depicts the gateway 180 routing the fourth audio stream 144 and the fifth audio stream 154 as separate audio streams, in other implementations, the gateway 180 may perform audio mixing on the fourth audio stream 144 and the fifth audio stream 154 to generate a mixed audio stream. The mixed audio stream may be routed to the network device 190, and the network device 190 may relay the mixed audio stream to the other devices 102, 110, 120, 130.

Additionally, although FIG. 1C depicts that the fourth device 140 and the fifth device 150 receive the same mixed audio stream 184, in other implementations, the fourth device 140 and the fifth device 150 may receive different mixed audio streams. For example, a mixed audio stream received by the fourth device 140 may include (or may be generated from) the audio streams 104, 114, 124, 134, 154 from the devices 102, 110, 120, 130, 150, respectively. Thus, the gateway 180 may be configured to mix the fifth audio stream 154 with the other audio streams 104, 114, 124, 134 to provide a mixed audio stream to the fourth device 140. In a similar manner, a mixed audio stream received by the fifth device 150 may include (or may be generated from) the audio streams 104, 114, 124, 134, 144 from the devices 102, 110, 120, 130, 140, respectively. Thus, the gateway 180 may be configured to mix the fourth audio stream 144 with the other audio streams 104, 114, 124, 134 to provide a mixed audio stream to the fifth device 150.

Figure 2A:
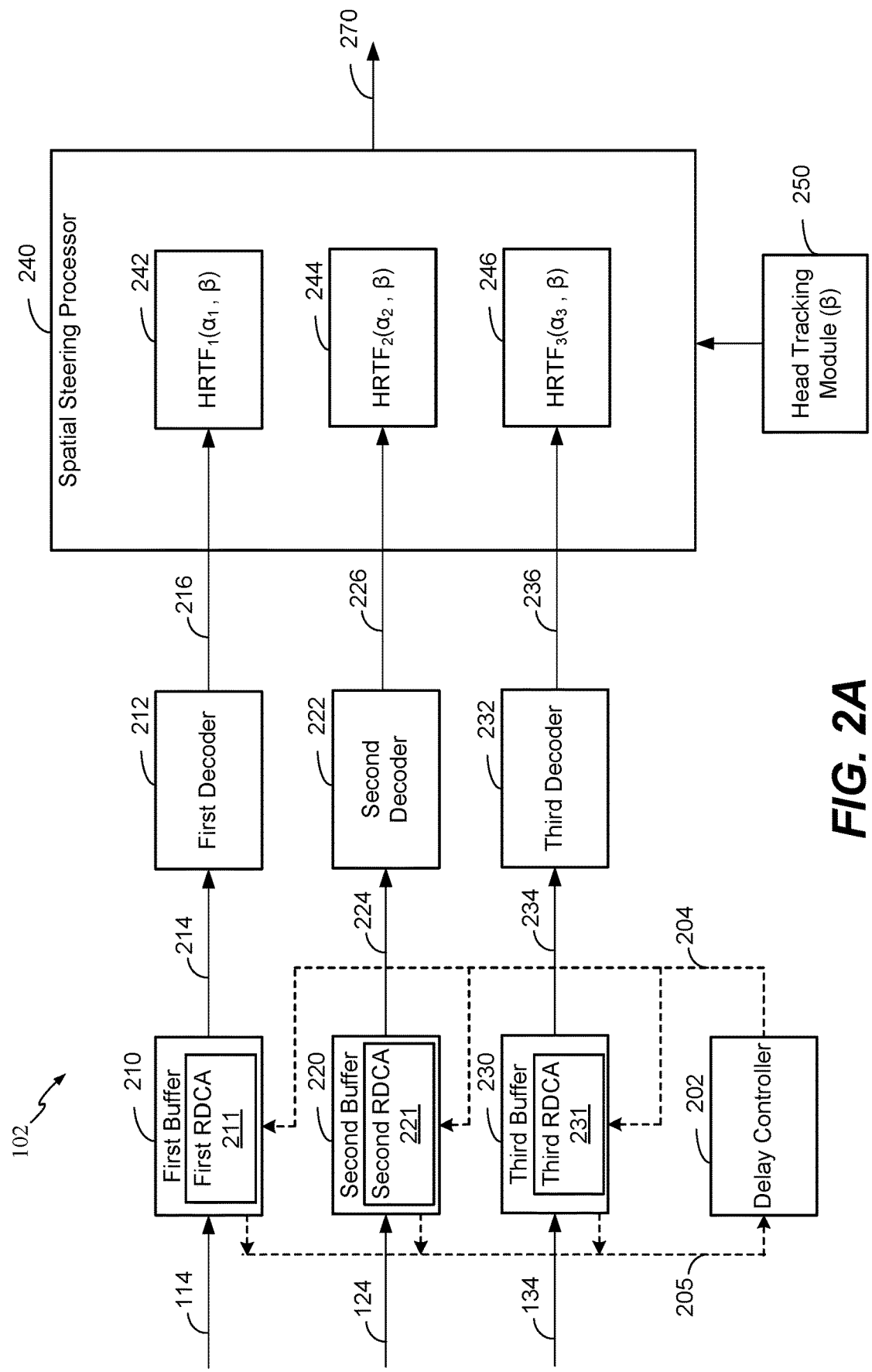
FIG. 2A is a diagram of a mobile device that is operable to manage audio during a conference.

Referring to FIG. 2A, a particular implementation of the mobile device 102 is shown. The mobile device 102 includes a delay controller 202, a first buffer 210, a first decoder 212, a second buffer 220, a second decoder 222, a third buffer 230, a third decoder 232, a spatial steering processor 240, and a head tracking module 250. It should be noted that although FIG. 2A illustrates components of the mobile device 102, similar components may be included in the other devices 110, 120, 130 associated with the conference.

In one example, each buffer 210, 220, 230 may be a de jitter buffer that is configured to buffer a corresponding audio stream. For example, the first buffer 210 may receive the first audio stream 114 (e.g., first Real-Time Transfer Protocol (RTP) packets) from the first device 110 associated with the first participant of the conference, the second buffer 220 may receive the second audio stream 124 (e.g., second RTP packets) from the second device 120 associated with the second participant of the conference, and the third buffer 230 may receive the third audio stream 134 (e.g., third RTP packets) from the third device 130 associated with the third participant of the conference. According to another implementation, the first buffer 210 may receive the first audio stream 114 from the network device 190 of FIG. 1A, the second buffer 220 may receive the second audio stream 124 from the network device 190, and the third buffer 230 may receive the third audio stream 134 from the network device 190. According to this implementation (e.g., the "network relay" implementation), the RTP time stamp of the first audio stream 114 as received by the first buffer 210 is the same as the RTP time stamp provided by the first device 110, the RTP time stamp of the second audio stream 124 as received by the second buffer 220 is the same as the RTP time stamp provided by the second device 120, and the RTP time stamp of the third audio stream 134 as received by the third buffer 230 is the same as the RTP time stamp provided by the third device 130.

Although, the mobile device 102 of FIG. 2A is shown to include three buffers 210, 220, 230 for the three corresponding audio streams 114, 124, 134, as described above with respect to FIG. 1A, in an alternative implementation the network device 190 of FIG. 1A may bundle packets of the audio streams 114, 124, 134 to generate a bundled audio stream, where each packet of the bundled audio stream includes the packets from the individual audio streams audio streams 114, 124, 134 in addition to a RTP header for the bundle packet. In this scenario, the mobile device 102 may utilize a single buffer (e.g., a single de-jitter buffer) that is configured to receive the packets of the bundled audio stream. For example, a packet of the bundled audio stream may include a RTP header, a first RTP packet (corresponding to the first audio stream 114) that is identified by a first ID assigned to the first device 110, a second RTP packet (corresponding to the second audio stream 124) that is identified by a second ID assigned to the second device 120, and a third RTP packet (corresponding to the third audio stream 134) that is identified by a third ID assigned to the third device 130. The RTP header for the bundled packet may include a time stamp. Alternatively, or in addition, the first, second, and third RTP packets may include their own RTP headers and time stamps.

The first buffer 210 may be configured to buffer the first audio stream 114 and output first buffered audio 214 to the first decoder 212. The second buffer 220 may be configured to buffer the second audio stream 124 and output second buffered audio 224 to the second decoder 222. The third buffer 230 may be configured to buffer the third audio stream 134 and output third buffered audio 234 to the third decoder 232. Each buffer 210, 220, 230 may include a reference delay calculation algorithm (RDCA). For example, the first buffer 210 may include a first RDCA 211, the second buffer 220 may include a second RDCA 221, and the third buffer 230 may include a third RDCA 231. Each RDCA 211, 221, 231 may be implemented by a processor (e.g., within the corresponding buffers 210, 220, 230) executing instructions. The delay for each buffer 210, 220, 230 may be based on the corresponding RDCA 211, 221, 231. As described below, the delay controller 202 controller may operate so that an average delay for each buffer 210, 220, 230 is substantially the same in order to satisfy a FER. For example, the delay controller 202 may be configured to modify each RDCA 211, 221, 231 to ensure that the first buffered audio 214, the second buffered audio 224, and the third buffered audio 234 are substantially synchronized.

The delay controller 202 (e.g., a de-jitter buffer synchronizer) may be configured to generate a control signal 204 that is provided to each buffer 210, 220, 230. Based on the control signal 204, the buffers 210, 220, 230 may synchronize output of the first buffered audio 214, the second buffered audio 224, and the third buffered audio 234. Alternatively, different control signals may be provided to each of the buffers 210, 220, 230. According to one implementation, the delay controller 202 may determine the delay within each buffer 210, 220, 230. For example, based on the first RDCA 211, the first buffer 210 may determine a first delay within the first buffer 210 and may provide information associated with the first delay to the delay controller 202 via a feedback signal 205. The second buffer 220 may determine a second delay within the second buffer 220 based on the second RDCA 221 and may provide information associated with the second delay to the delay controller 202 via the feedback signal 205. Additionally, the third buffer 230 may determine a third delay within the third buffer 230 based on the third RDCA 231 and may provide information associated with the third delay to the delay controller 202 via the feedback signal 205. The first, second, and third delays may be determined based on intra-stream time stamps within individual audio streams. As a non-limiting example, the first delay may be based on RTP time stamps in the first audio stream 114 (e.g., the first delay may be independent of RTP time stamps in the other audio streams 124, 134).

The delay controller 202 may use the information about the first, second, and third delays to generate the control signal 204. Although a single control signal is depicted in FIG. 2A, a first control signal may be provided to the first buffer 210, a second control signal may be provided to the second buffer 220, and a third control signal may be provided to the third buffer 230. The control signal 204 (or multiple control signals) may instruct each buffer 210, 220, 230 to "speed up", increase the delay, or maintain the current delay such that each buffer 210, 220, 230 has a substantially similar average delay. "Speeding up" a buffer may include instructing the buffer to "drop" one or more frames. To illustrate, the first buffer 210 may have an average delay of two frames, the second buffer 220 may have an average delay of four frames, and the third buffer 230 may have an average delay of six frames. Based on these statistics, the delay controller 202 may instruct the first buffer 210 to increase its average delay by two frames, instruct the second buffer 220 to maintain its current average delay, and instruct the third buffer 230 to speed up its average delay by two frames so that each buffer 210, 220, 230 has an average delay of approximately four frames. Additionally, buffer resources may be reallocated based on delay adjustments. For example, because the first buffer 210 needs to increase its average delay by two frames and the third buffer 230 needs to reduce its delay by two frames, buffer resources may be reallocated between the third buffer 230 and the first buffer 210.

Thus, the delay controller 202 may use inter-stream time stamps, in addition to intra-stream time stamps, to adjust the delay of each buffer 210, 220, 230. For example, the delays for each buffer 210, 220, 230 may be adjusted based on comparing the average delays of each buffer 210, 220, 230, and the average delays of each buffer 210, 220, 230 is based on RTP time stamps of the corresponding audio streams 114, 124, 134. As an illustrative non-limiting example, time stamps of the various RTP packets received from three devices "A," "B," and "C" may be t(A, 1), t(A, 2), t(A, 3) . . . t(A, N); t(B, 1), t(B, 2), t(B, 3) . . . t(B, N); t(C, 1), t(C, 2), t(C, 3) . . . t(C, N). Intra-stream time stamps may correspond to the time difference between two packets of the same RTP stream (e.g., t(A,2) and t(A,1)). The delay controller 202 may determine and/or use average delay within a stream and inter-stream delay between streams to generate the control signal 204.

According to another implementation, the delay controller 202 may compare a first time stamp of the first audio stream 114 (e.g., a first RTP packet), a second time stamp of the second audio stream 124 (e.g., a second RTP packet), and a third time stamp of the third audio stream 134 (e.g., a third RTP packet). In one example, the first, second, and third time stamps may be based on a common clock source (e.g., a global clock source) that is provided (e.g., by a timing server or other clock source) to the 102, 110, 120, and 130. The time stamps of the audio streams 114, 124, 134 may be received by the mobile device 102 unchanged by the network device 190 of FIG. 1A. The delay controller 202 may determine a first time difference between the first time stamp and the second time stamp, a second time difference between the second time stamp and the third time stamp, and a third time difference between the third time stamp and the first time stamp.

In a particular implementation, the delay controller 202 determines the time differences based on comparing individual packets from different buffers. For example, the first time difference may correspond to a difference between a time stamp of the "earliest" packet (e.g., the next packet to be output) in the first buffer 210 and a time stamp of the earliest packet in the second buffer 220. Similarly, the second time difference may correspond to a difference between the time stamp of the earliest packet in second buffer 220 and a time stamp of the earliest packet in the third buffer 230. The third difference may correspond to a difference between the time stamp of the earliest packet in the third buffer 230 and the time stamp of the earliest packet in the first buffer 210.

Based on the time differences, the delay controller 202 may generate the control signal 204 to control when the buffered audio 214, 224, 234 is output from the buffers 210, 220, 230, respectively, so that the buffered audio 214, 224, 234 is synchronized. For example, the control signal 204 (or the multiple control signals as described above) may cause packets/frames in the buffers 210, 220, and 230 that have the same time stamp to be output substantially concurrently, regardless of when such packets/frames were actually received by the mobile device 102. After a packet is output from one of the buffers 210, 220, 230, the delay controller 202 may recalculate one or more of the time differences and modify the control signal 204 accordingly. By generating the control signal 204 to synchronize the buffered audio 214, 224, 234, the delay controller 202 may assist each of the buffers 210, 220, 230 in satisfying the 3GPP Technical Specification (TS) 26.114 average delay requirements during the conference, such as by making average delay across the buffers 210, 220, 230 comparable.

As a non-limiting illustration of synchronizing the first buffered audio 214 with the second buffered audio 224, the delay controller 202 may indicate (via the control signal 204) to the first buffer 210 to delay outputting (e.g., the next packet of) the first buffered audio 214 by the first time difference if the first time stamp indicates an earlier time than the second time stamp. If the second time stamp indicates an earlier time than the first time stamp, the delay controller 202 may indicate (via the control signal 204) to the second buffer 220 to delay outputting (e.g., the next packet of) the second buffered audio 224 by the first time difference.

Thus, the delay controller 202 may be configured to monitor the performance of each individual buffer 210, 220, 230 such that the TS 26.114 minimum performance jitter buffer management (JBM) delay requirements are met during the multi-session (e.g., the conference). Further, the delay controller 202 may provide additional time stamp adjustment information to RDCAs 211, 221, 231 in each buffer 210, 220, 230 such that "buffer handling" is efficiently performed. As described above, the delay controller 202 may receive intra time stamp characteristics from the RDCAs 211, 221, 231 running in each buffer 210, 220, 230 via the feedback signal 205, and the delay controller 202 may use such information in managing the buffers 210, 220, 230. Thus, a "closed loop" methodology for managing buffer delay may be implemented.

In response to receiving the first buffered audio 214, the first decoder 212 may decode the first buffered audio 214 to generate first decoded audio 216. The first decoded audio 216 may be provided to the spatial steering processor 240. However, if a frame in the first buffered audio 214 is a DTX (or NODATA) frame (e.g., corresponding to background noise and/or silence), decoding operations at the first decoder 212 may be bypassed to reduce power consumption and to save processing resources. When decoding operations are skipped for a frame, decoding state/memories for the previously decoded active frame may be maintained for use in subsequently decoding a next active frame. In response to receiving the second buffered audio 224, the second decoder 222 may decode the second buffered audio 224 to generate second decoded audio 226. The second decoded audio 226 may also be provided to the spatial steering processor 240. If a frame in the second buffered audio 224 is a DTX (or NODATA) frame, decoding operations at the second decoder 222 may be bypassed to reduce power consumption and to save processing resources. In response to receiving the third buffered audio 234, the third decoder 232 may decode the third buffered audio 234 to generate third decoded audio 236. The third decoded audio 236 may further be provided to the spatial steering processor 240. If a frame in the third buffered audio 234 is a DTX frame, decoding operations at the third decoder 232 may be bypassed to reduce power consumption and save processing resources. In a particular implementation, the mobile device 102 may determine whether a frame (e.g., a packet) is a DTX (or NODATA) frame based on the RTP packet length.

Figure 3:
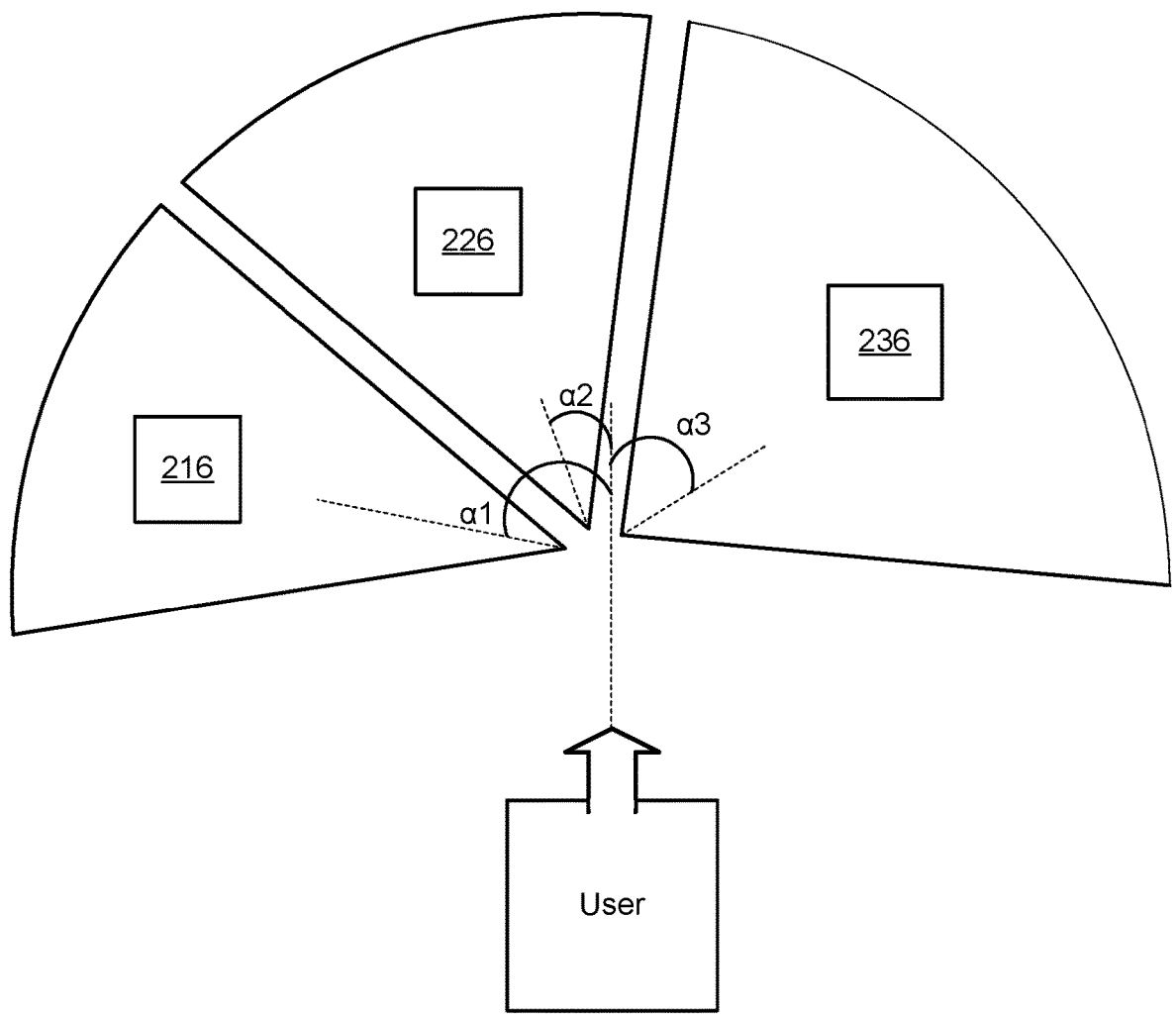
FIG. 3 is a diagram illustrating decoded audio processed using head-related transfer functions (HRTFs)

The spatial steering processor 240 may be configured to perform a first spatial steering operation on the first decoded audio 216 to project the first decoded audio 216 from a speaker at a first angle ($\alpha 1$). For example, the spatial steering processor 240 may apply a first HRTF 242 to the first decoded audio 216 to steer (e.g., pan) the first decoded audio 216 according to the first angle ($\alpha 1$). An illustration of steering the first decoded audio 216 according to the first angle ($\alpha 1$) is depicted in FIG. 3. The first HRTF 242 may also be used by the spatial steering processor 240 to adjust a first gain of the first decoded audio 216. According to one implementation, the first gain and the first angle ($\alpha 1$) may be adjusted based on user-defined settings at the mobile device 102. For example, if the user determines that speech from the first participant associated with the first device 110 is more important than speech associated with the other participants of the conference, the user may indicate to the mobile device 102 to increase the first gain of the first decoded audio 216. Based on the user indication, the spatial steering processor 240 may use the first HRTF 242 to increase the first gain of the first decoded audio 216.

The spatial steering processor 240 may also be configured to perform a second spatial steering operation on second decoded audio 226 to project the second decoded audio 226 from the speaker at a second angle ($\alpha 2$). For example, the spatial steering processor 240 may apply a second HRTF 244 to the second decoded audio 226 to steer (e.g., pan) the second decoded audio 226 according to the second angle ($\alpha 2$). An illustration of steering the second decoded audio 226 according to the second angle ($\alpha 2$) is depicted in FIG. 3. The second HRTF 244 may also be used by the spatial steering processor 240 to adjust a second gain of the second decoded audio 226. According to one implementation, the second gain and the second angle ($\alpha 2$) may be adjusted based on user-defined settings at the mobile device 102. For example, if the user determines that speech from the second participant associated with the second device 120 is less important than speech associated with the other participants of the conference, the user may indicate to the mobile device 102 to decrease the second gain of the second decoded audio 226 (or mute the second decoded audio 226). Based on the user indication, the spatial steering processor 240 may use the second HRTF 244 to decrease the second gain of the second decoded audio 226.

The spatial steering processor 240 may also be configured to perform a third spatial steering operation on third decoded audio 236 to project the third decoded audio 236 from the speaker at a third angle ($\alpha 3$). For example, the spatial steering processor 240 may apply a third HRTF 246 to the third decoded audio 236 to steer (e.g., pan) the third decoded audio 236 according to the third angle ($\alpha 3$). An illustration of steering the third decoded audio 236 according to the third angle ($\alpha 3$) is depicted in FIG. 3. The third HRTF 246 may also be used by the spatial steering processor 240 to adjust a third gain of the third decoded audio 236. According to one implementation, the third gain and the third angle ($\alpha 3$) may be adjusted based on user-defined settings at the mobile device 102. For example, if the user determines that speech from the third participant associated with the third device 130 is less important than speech associated with the other participants of the conference, the user may indicate to the mobile device 102 to decrease the third gain of the third decoded audio 236 (or mute the third decoded audio 236). Based on the user indication, the spatial steering processor 240 may use the third HRTF 246 to decrease the third gain of the third decoded audio 236.

Each HRTF 242, 244, 246 may be generic or may be "personalized" by a user of the mobile device 102. For example, the based on the number of incoming audio streams 114, 124, 134 and based on the hardware capabilities of the mobile device 102, the user may indicate a location (e.g., an angle) at which a particular audio stream 114, 124, 134 is to be projected. Thus, the first HRTF 242 may be different from the second HRTF 244, and the second HRTF 244 may be different from the third HRTF 246. For example, the user may indicate to the mobile device 102 (via the first HRTF 242) to project the first decoded audio 216 at the left side of the "speaker," (e.g., a perceived listening field of the user) indicate to the mobile device 102 (via the second HRTF 244) to project the second decoded audio 226 at the right side of the speaker, and indicate to the mobile device 102 (via the third HRTF 246) to project the third decoded audio 236 in the middle. In another implementation, the user may indicate to a network mixer (e.g., the network device 190 of FIG. 1A) to use a specific HRTF if the network mixer is performing audio mixing. For example, the network device 190 or another network mixer may be populated with HRTFs, which may be negotiated during conference setup.

Thus, the spatial steering processor 240 may apply the HRTFs 242, 244, 246 to the decoded audio 216, 226, 236, respectively, to spatially steer the decoded audio 216, 226, 236 such that is appears that the conference participants associated with the decoded audio 216, 226, 236 are spatially distributed in a particular configuration. The HRTFs 242, 244, 246 may be used to perform audio panning at the mobile device 102. Audio panning may reduce the "fatigue" to the user of the mobile device 102 when multiple participants of the conference are speaking. For example, if the first participant (e.g., the participant associated with the first decoded audio 216) and the third participant (e.g., the participant associated with the third decoded audio 236) are simultaneously speaking, the audio panning may make it appear to the user that the first participant is speaking at one location and the third participant is speaking at another location, which may reduce fatigue experienced by the user.

Audio panning may also enable the user of the mobile device 102 to vary the audio levels (e.g., the gains) of the participants prior to HRTF mixing (e.g., prior to generating a stereo signal 270, as described below). For example, the user of the mobile device 102 may give greater importance to the first participant's audio (e.g., the first decoded audio 216) relative to the other participants' audio and may selectively adjust the mixing gain in each HRTF 242, 244, 246. In one example, the user of the mobile device 102 may mute all of the decoded audio 226, 236 except the first decoded audio 216 when multiple participants are simultaneously talking. As explained with respect to FIG. 1A, the user of the mobile device 102 may also signal to the network device 190 to manage the bit rate and audio bandwidth for each audio stream 114, 124, 134 based on talker preferences and hardware capabilities of the mobile device 102.

In a particular implementation, spatial processing at the mobile device 102 may be further refined based on head tracking data (e.g., data indicating head movement associated with the user of the mobile device 102). For example, the head tracking module 250 may track a shift (e.g., a rotation) of the head of the user of the mobile device 102. For example, the head tracking module 250 may track an orientation of the user's head and provide a signal (for example, indicating a shift amount ($\beta$) in the orientation) to the spatial steering processor 240. The spatial steering processor may adjust each HRTF 242, 244, 246 by the shift amount ($\beta$) to accommodate the respective angles at which the decoded audio 216, 226, 236 is projected at the speaker. Thus, the spatial steering processor 240 may use the first angle ($\alpha1$) and the shift amount ($\beta$) as inputs for the first HRTF 242, the second angle ($\alpha2$) and the shift amount ($\beta$) as inputs for the second HRTF 244, and the third angle ($\alpha3$) and the shift amount ($\beta$) as inputs for the third HRTF 246.

The spatial steering processor 240 may output (e.g., provide to the speaker) the stereo signal 270 that includes each decoded audio 216, 226, 236 that is adjusted by the respective HRTFs 242, 244, 246. Although FIG. 2A illustrates that a stereo signal 270 is output by the spatial steering processor 240, in another implementation, the spatial steering processor 240 may output three mono-signals (not shown). For example, a first mono-signal may include the first decoded audio 216 that is adjusted by the first HRTF 242, the second mono-signal may include the second decoded audio 226 that is adjusted by the second HRTF 244, and the third mono-signal may include the third decoded audio 236 that is adjusted by the third HRTF 246.

The mobile device 102 of FIG. 2A may satisfy the 3GPP TS 26.114 delay requirements during the conference by synchronizing the buffered audio 214, 224, 234. For example, the delay controller 202 may generate the control signal 204 to synchronize the buffered audio 214, 224, 234 based on time stamps in RTP packets of the corresponding audio streams 114, 124, 134. Additionally, the mobile device 102 may enable audio panning to reduce "fatigue" when multiple participants of the conference are simultaneously speaking. For example, the mobile device 102 may spatially steer the decoded audio 216, 226, 236 such that is appears that the conference participants associated with the decoded audio 216, 226, 236 are spatially distributed.

Figure 2B:
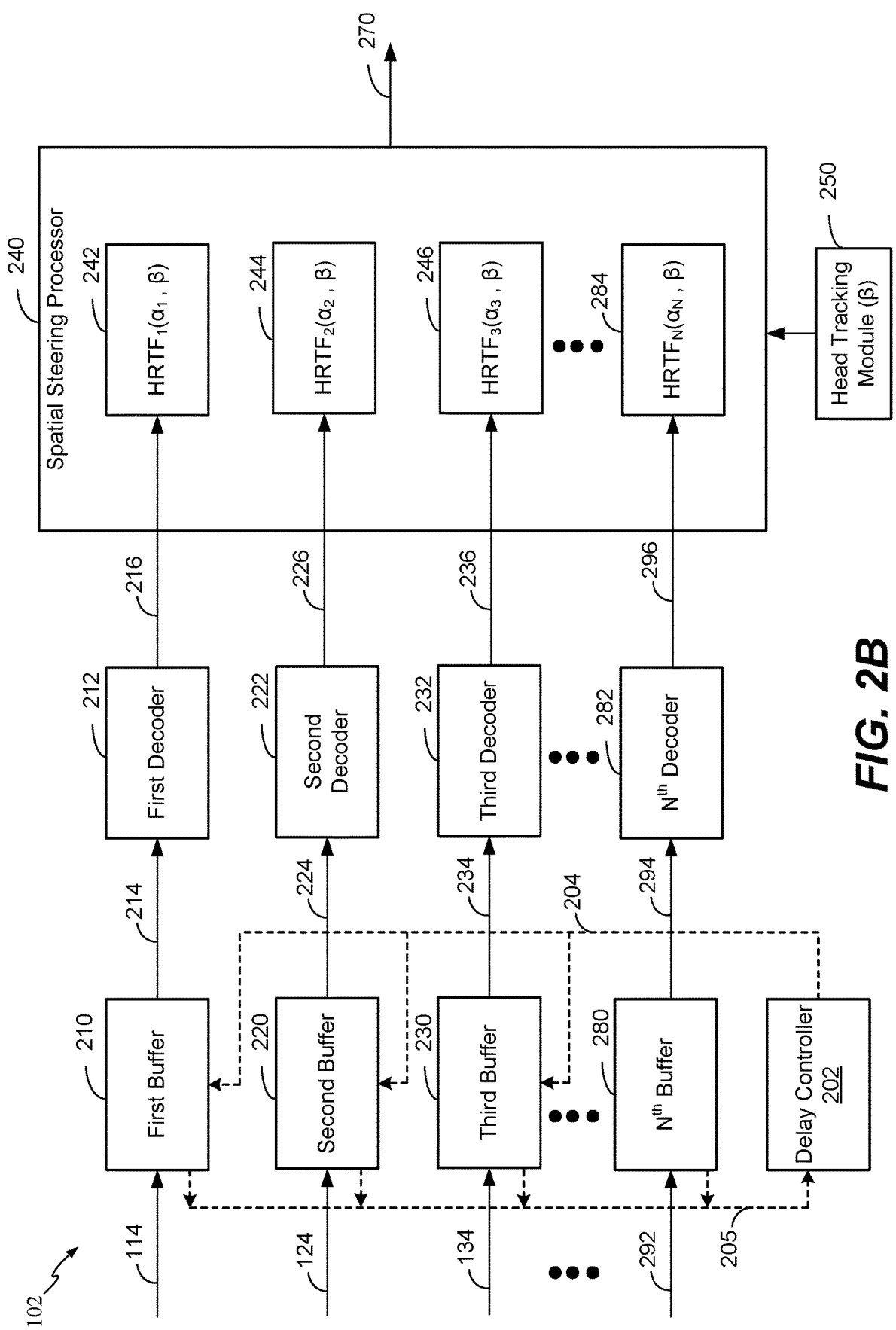
FIG. 2B is another implementation of the mobile device in FIG. 2A.

Referring to FIG. 2B, another implementation of the mobile device 102 is shown. In addition to the components depicted in FIG. 2A, the mobile device 102 depicted in FIG. 2B may include an $N^{th}$ buffer 280, an $N^{th}$ decoder 282, and an $N^{th}$ HRTF 284 implemented within the spatial steering processor 240. Thus, in accordance with the described systems and methods, a device may utilize a single de jitter buffer (e.g., in the case of processing a bundled RTP stream), two de-jitter buffers, three de-jitter buffers, or N de-jitter buffers (e.g., where N is an integer greater than or equal to 4). For example, if N is equal to seven, the mobile device 102 depicted in FIG. 2B may include seven buffers (configured to receive seven corresponding audio streams), seven decoders, and seven HRTFs implemented within the spatial steering processor 240.

The $N^{th}$ buffer 280 may operate in a substantially similar manner as the buffers 210, 220, 230. For example, the $N^{th}$ buffer may be configured to receive an $N^{th}$ audio stream 292 from a device in the conference (or from the network device 190 of FIG. 1A) and to output $N^{th}$ buffered audio 294 based on the control signal 204. The $N^{th}$ buffered audio 294 may be synchronized with the buffered audio 214, 224, 234 from the other buffers 210, 220, 230, respectively. The $N^{th}$ decoder 282 may operate in a substantially similar manner as the decoders 212, 222, 232. For example, the $N^{th}$ decoder 232 may decode the $N^{th}$ buffered audio 294 to generate $N^{th}$ decoded audio 296. The $N^{th}$ decoded audio 296 may be provided to the spatial steering processor 240. The spatial steering processor 240 may also be configured to perform an $N^{th}$ spatial steering operation on $N^{th}$ decoded audio 296 to project the $N^{th}$ decoded audio 296 from the speaker at an $N^{th}$ angle ($\alpha N$). For example, the spatial steering processor 240 may apply the $N^{th}$ HRTF 284 to the $N^{th}$ decoded audio 296 to steer (e.g., pan) the $N^{th}$ decoded audio 296 according to the $N^{th}$ angle ($\alpha N$).

Referring to FIG. 3, a diagram illustrating an example of a spatial arrangement of the decoded audio 216, 226, 236 after applying the HRTFs 242, 244, 246 is shown. In a particular implementation, the HRTFs 242, 244, 246 may be precomputed based on a "preferred" virtual speaker location assignment. For example, the first HRTF 242 may spatially steer the first decoded audio 216 to be perceived as if coming from the left side of a speaker (e.g., coming from the first angle ($\alpha1$)). Similarly, the second HRTF 244 may spatially steer the second decoded audio 226 to be perceived as if coming from the left-center side of the speaker (e.g., coming from the second angle ($\alpha2$)), and the third HRTF 246 may spatially steer the third decoded audio 236 to be perceived as if coming from the right side of the speaker (e.g., coming from the third angle ($\alpha3$)). As described with respect to FIG. 2A, the HRTFs 242, 244, 246 may also include gain control to emphasize a "preferred" speaker relative to other speakers.

Figure 4:
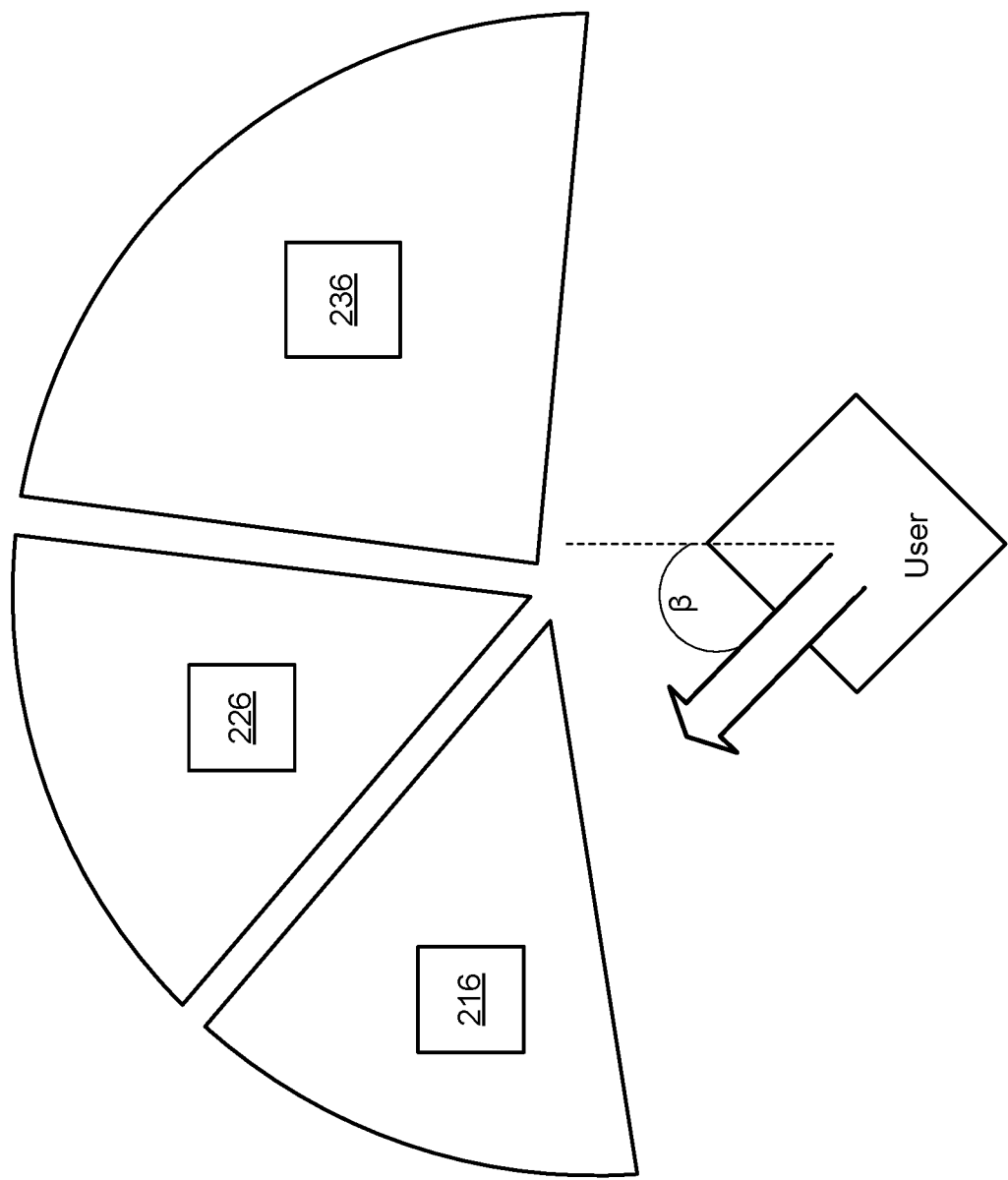
FIG. 4 is a diagram illustrating decoded audio processed using HRTFs and head tracking data.

Referring to FIG. 4, a diagram illustrating an example of a spatial arrangement of the decoded audio 216, 226, 236 after applying the HRTFs 242, 244, 246 and head tracking data is shown. In FIG. 4, the head tracking module 250 may detect that the user's head shifted by the shift amount ($\beta$). Based on the head tracking information, the spatial steering processor 240 may shift a sound field including the decoded audio 216, 226, 236 by the shift amount ($\beta$) as illustrated in FIG. 4. Thus, the perception of where the decoded audio 216, 226, 236 illustrated in FIG. 3 may be substantially unchanged when the user of the mobile device 102 shifts his/her head.

Figure 5:
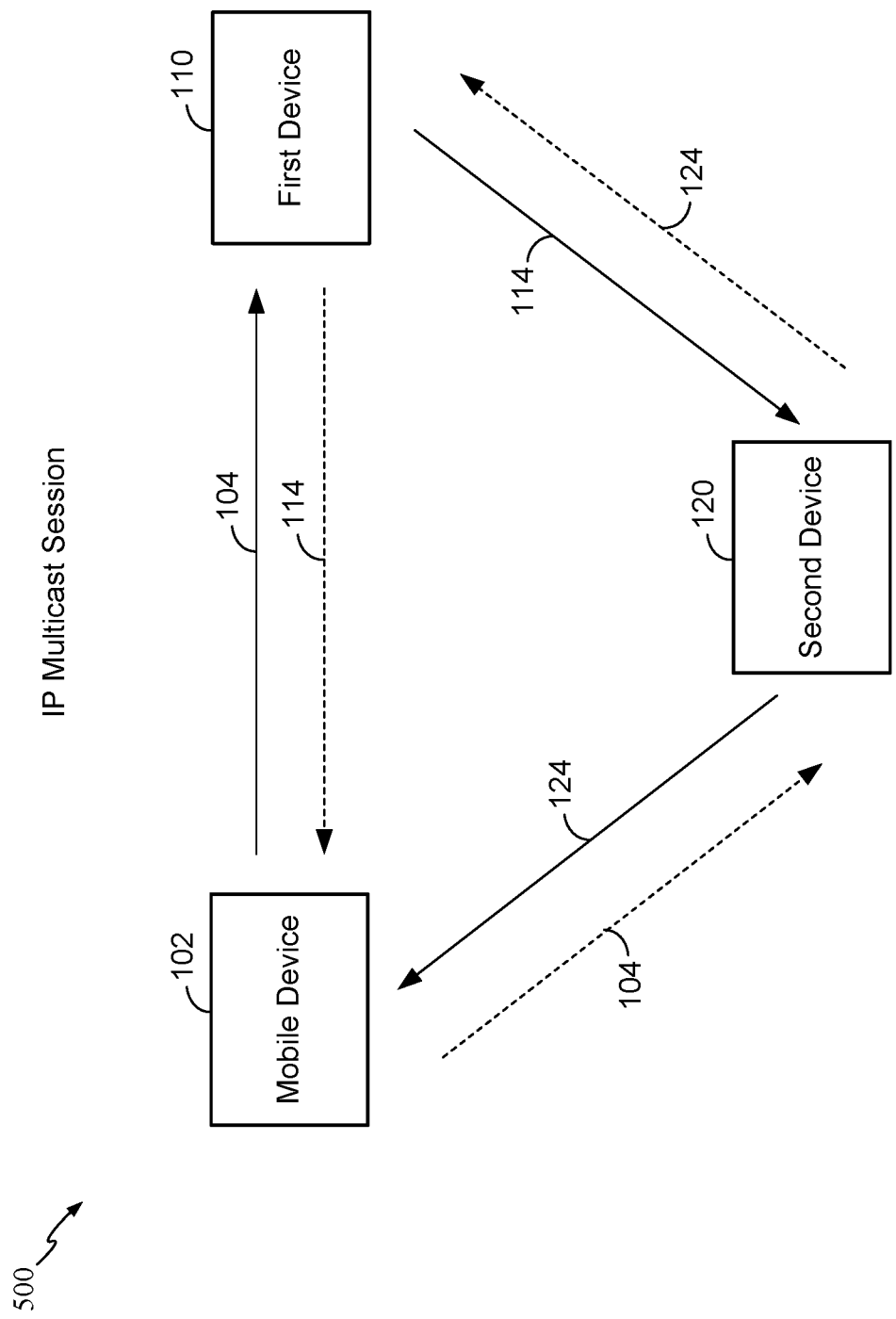
FIG. 5 is a diagram illustrating a system that is operable to manage audio during a conference using an internet protocol (IP) multicast session.

Referring to FIG. 5, a particular implementation of a system 500 that is operable to manage audio during a conference using an internet protocol (IP) multicast session is shown. The system 500 includes the mobile device 102, the first device 110, and the second device 120.

According to a particular implementation of operation, the mobile device 102 may initiate a call with the first device 110. The mobile device 102 may subsequently initiate a session description protocol (SDP) reference for the first device 110 to initiate a multicast session with the second device 120. The second device 120 may also initiate a session with the mobile device 102. In a particular implementation, if N nodes participate in the conference, N*(N−1) sessions may be initiated per media (e.g., for 3 nodes, 3*2=6 sessions may be initiated for audio, another 3*2=6 sessions may be initiated for video, etc.). In the multicast session of FIG. 5, there is no implicit network device, such as the network device 190 of FIG. 1A. Thus, session initiation protocol (SIP) signaling and SDP negotiation may be based on a CODEC supported by each device 102, 110, 120. SIP signaling and SDP negotiations may be used to select an audio CODEC, a bit rate, an audio bandwidth, etc.

According to one implementation, one or more of the devices 102, 110, 120 may operate as a gateway (e.g., network gateway) based on hardware resources that are available. If a device operates as a gateway, a CODEC requirement may be relaxed. For example, if a CODEC of the first device 110 is not compatible to decode the audio stream 104 from the mobile device 102, the second device 120 may operate as a gateway and decode the audio stream 104, re-encode the audio stream in a format supported by the first device 110, and provide the re-encoded audio stream to the first device 110.

Figure 6:
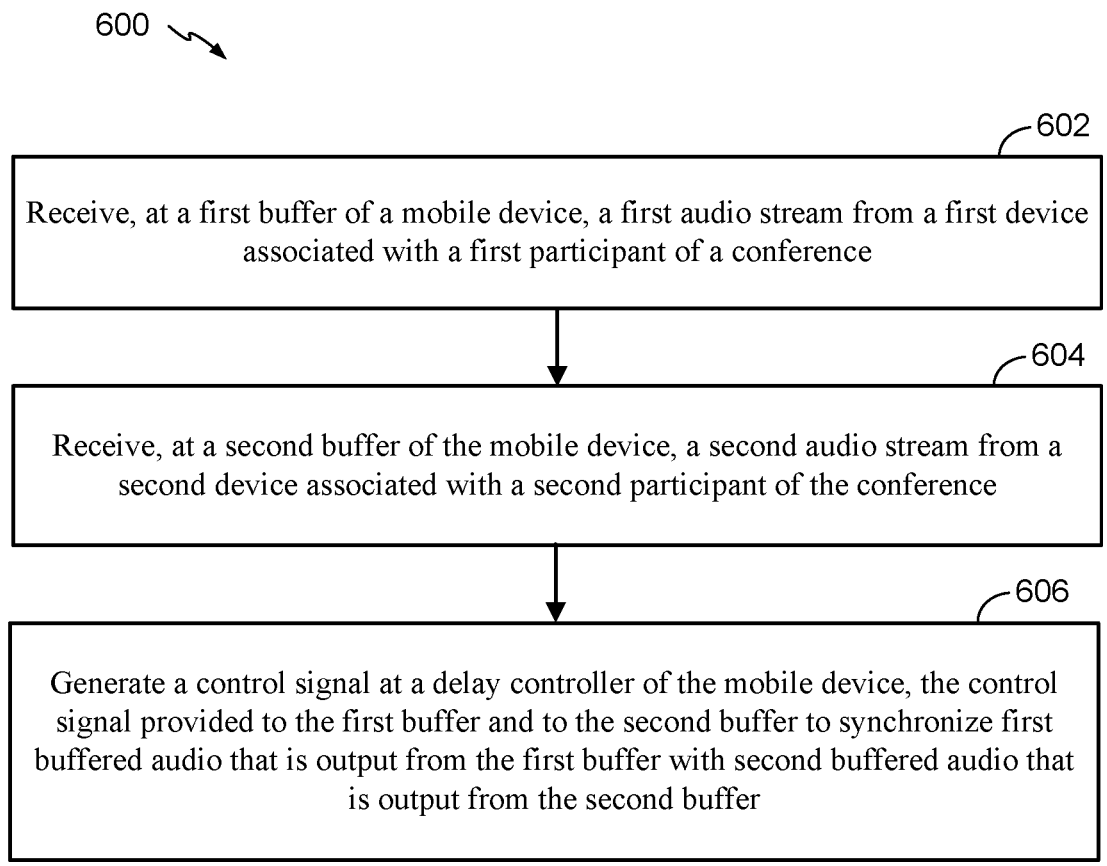
FIG. 6 is a flowchart illustrating a method for managing audio during a conference.

Referring to FIG. 6, a flowchart of a method 600 for managing audio during a conference is shown. The method 600 may be performed by the mobile device 102 of FIGS. 1A-2B, the first device 110 of FIGS. 1A-1C, the second device 120 of FIGS. 1A-1C, the third device 130 of FIGS. 1A-1C, or a combination thereof.

The method 600 includes receiving, at a first buffer of a mobile device, a first audio stream from a first device associated with a first participant of a conference, at 602. For example, referring to FIG. 2A, the first buffer 210 may receive the first audio stream 114 (e.g., RTP packets) from the first device 110.

The method 600 may also include receiving, at a second buffer of the mobile device, a second audio stream from a second device associated with a second participant of the conference, at 604. For example, referring to FIG. 2A, the second buffer 220 may receive the second audio stream 124 (e.g., RTP packets) from the second device 120.

A control signal may be generated at a delay controller of the mobile device, at 606. The control signal may be provided to the first buffer and to the second buffer to synchronize first buffered audio that is output from the first buffer with second buffered audio that is output from the second buffer. For example, referring to FIG. 2A, the delay controller 202 may compare the first time stamp of (e.g., an earliest packet of) the first audio stream 114 with the second time stamp of (e.g., an earliest packet of) the second audio stream 124 and determine a time difference between the first time stamp and the second time stamp. If the first time stamp indicates an earlier time than the second time stamp, the control signal 204 may indicate to the first buffer 210 to delay outputting the first buffered audio 214 by the time difference to synchronize the first buffered audio 214 with the second buffered audio 224. If the second time stamp indicates an earlier time that the first time stamp, the control signal 204 may indicate to the second buffer 220 to delay outputting the second buffered audio 224 by the time difference to synchronize the first buffered audio 214 with the second buffered audio 224. The delay controller may take into account the inter-packet arrival times between packets [A1, A2, . . . ] and packets [B1, B2, . . . ] from participants A and B and estimate varying de jitter buffer depth needed for buffering media from participant A and participant B while keeping the packet loss (or jitter-induced concealment) low and meeting the minimum performance requirements of 3GPP TS 26.114. For example, participant A may be in poor radio channel conditions and has high packet loss rate with low jitter, while participant B is in good radio channel condition with very low packet loss rate but high jitter. The delay controller takes in to account the jitter/loss characteristics of packets from participant A and B, to assign, e.g., a larger buffer depth for packets from participant B such that the overall packet loss does not exceed that of the loss experienced from participant A. The above delay controller mechanism may also be extended for cases including receiving more than two media streams.

According to one implementation, the method 600 may further include decoding, at a first decoder of the mobile device, the first buffered audio to generate first decoded audio. For example, referring to FIG. 2A, the first decoder 212 may decode the first buffered audio 214 to generate the first decoded audio 216. The method 600 may also include decoding, at a second decoder of the mobile device, the second buffered audio to generate second decoded audio. For example, referring to FIG. 2A, the second decoder 222 may decode the second buffered audio 224 to generate the second decoded audio 226.

According to one implementation, the method 600 may include performing a first spatial steering operation on the first decoded audio to project the first decoded audio from a speaker at a first angle. For example, referring to FIG. 2A, the spatial steering processor 240 may perform the first spatial steering operation on the first decoded audio 216 to project the first decoded audio 216 from the speaker at the first angle ($\alpha 1$). To illustrate, the spatial steering processor 240 may apply the first HRTF 242 to the first decoded audio 216 to steer (e.g., pan) the first decoded audio 216 according to the first angle ($\alpha 1$). The first HRTF 242 may also be used by the spatial steering processor 240 to adjust the first gain of the first decoded audio 216.

According to one implementation of the method 600, a first decoder may receive the control signal from the delay controller and a second decoder may also receive the control signal from the delay controller. The first decoder may decode a first data packet associated with the first audio stream based on the control signal or bypass decoding operations on the first data packet based on the control signal. Similarly, the second decoder may decode a second data packet associated with the second audio stream based on the control signal or bypass decoding operations on the second data packet based on the control signal. According to one implementation, the first decoder and the second decoder are different decoders. The first decoder may be supported by all conference participants and the second decoder may be supported by a subset of conference participants. According to another implementation, the first decoder and the second decoder include a similar decoder that operates in different modes The method 600 may also include performing a second spatial steering operation on the second decoded audio to project the second decoded audio from the speaker at a second angle. For example, referring to FIG. 2A, the spatial steering processor 240 may perform the second spatial steering operation on the second decoded audio 226 to project the second decoded audio 226 from the speaker at the second angle ($\alpha 2$). To illustrate, the spatial steering processor 240 may apply the second HRTF 244 to the second decoded audio 226 to steer (e.g., pan) the second decoded audio 226 according to the second angle (α2). The second HRTF 244 may also be used by the spatial steering processor 240 to adjust the second gain of the second decoded audio 226.

According to one implementation, the method 600 may include providing a first signal to a network device to adjust a first bit rate of the first audio stream. For example, referring to FIGS. 1A and 2A, the network device 190 may route the first audio stream 114 from the first device 110 to the first buffer 210 of the mobile device 102, and the network device 190 may route the second audio stream 124 from the second device 120 to the second buffer 220 of the mobile device 102. The mobile device 102 may provide the first signal to the network device 190 to adjust the first bit rate at which the first audio stream 114 is provided to the mobile device 102. The method 600 may also include providing a second signal to the network device to adjust a second bit rate of the second audio stream. For example, referring to FIG. 1A, the mobile device 102 may provide the second signal to the network device 190 to adjust a second bit rate at which the second audio stream 124 is provided to the mobile device 102.

The method 600 of FIG. 6 may satisfy the 3GPP TS 26.114 delay requirements during the conference by synchronizing the buffered audio 214, 224, 234. For example, the delay controller 202 may generate the control signal 204 to synchronize the buffered audio 214, 224, 234 based on time stamps in RTP packets of the corresponding audio streams 114, 124, 134. Additionally, the method 600 may enable audio panning to reduce "fatigue" when multiple participants of the conference are simultaneously speaking. For example, the method 600 may enable spatially steering of the decoded audio 216, 226, 236 such that is appears that the conference participants associated with the decoded audio 216, 226, 236 are spatially distributed.

In some examples, the method 600 of FIG. 6 may be implemented via hardware (e.g., an FPGA device, an ASIC, etc.) of a processing unit, such as a central processing unit (CPU), a DSP, or a controller, via a firmware device, or any combination thereof. As an example, the method 600 of FIG. 6 can be performed by a processor that executes instructions, as described with respect to FIG. 7.

Figure 7:
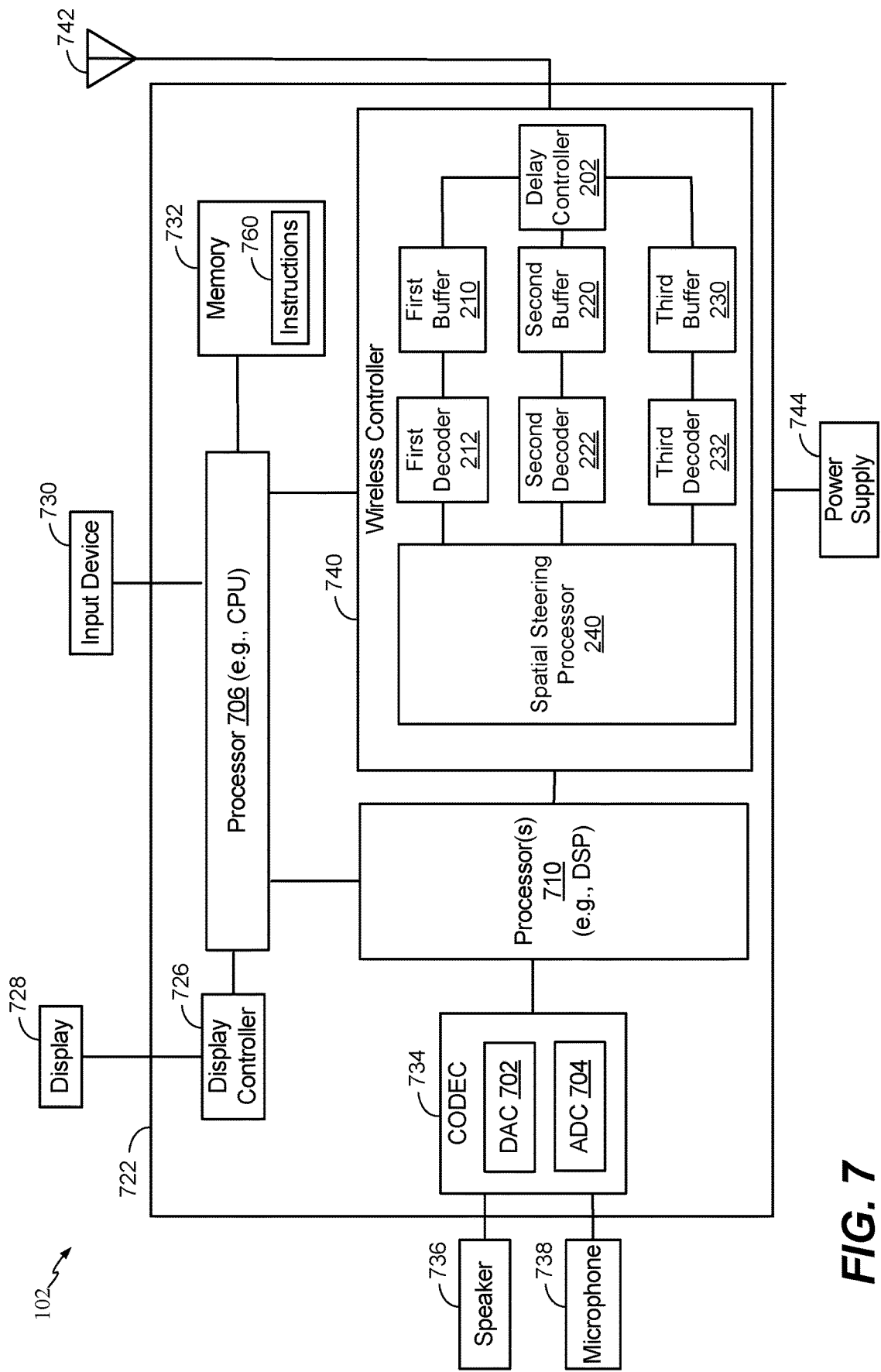
FIG. 7 is a block diagram of a mobile device operable to perform signal processing operations in accordance with the systems, diagrams, and methods of FIGS. 1A-6.

Referring to FIG. 7, a block diagram of a particular illustrative implementation of the mobile device 102 is shown. In a particular implementation, the device 102 includes a processor 706 (e.g., a CPU). The mobile device 102 may include one or more additional processors 710 (e.g., one or more DSPs).

The mobile device 102 may include a memory 732 and a wireless controller 740 coupled to an antenna 742. The wireless controller 740 include the delay controller 202 of FIGS. 2A-2B, the first buffer 210 of FIGS. 2A-2B, the first decoder 212 of FIGS. 2A-2B, the second buffer 220 of FIGS. 2A-2B, the second decoder 222 of FIGS. 2A-2B, the third buffer 230 of FIGS. 2A-2B, the third decoder 232 of FIGS. 2A-2B, and the spatial steering processor 240 of FIGS. 2A-2B. Logic of the delay controller 202 of FIGS. 2A-2B may be also implemented within the processor 706, or the one or more additional processors 710. Thus, first buffer 210 in the wireless controller 740 may be configured to receive the first audio stream 114 via the antenna 742, the second buffer 220 in the wireless controller 740 may be configured to receive the second audio stream 124 via the antenna 742, and the third buffer 230 in the wireless controller 740 may be configured to receive the third audio stream 134 via the antenna 742. To satisfy the 3GPP TS 26.114 delay requirements during a conference, a control signal (not shown) may be provided to the buffers 210, 220, 230 to synchronize buffered audio that is output from the buffers 210, 220, 230, as described above.

The mobile device 102 may include a display 728 coupled to a display controller 726. A speaker 736, a microphone 738, or both may be coupled to a CODEC 734. The CODEC 734 may include a digital-to-analog converter (DAC) 702 and an analog-to-digital converter (ADC) 704. In one example, the output of the spatial steering processor (e.g., a stereo signal) may be provided to the one or more additional processors 710 for further processing and to the CODEC 734. The stereo signal may be converted to an analog signal via the DAC 702 and output at the speaker 736.

The memory 732 may include instructions 760 executable by the processor 706, the processors 710, the CODEC 734, the wireless controller 740 and the components thereof, or a combination thereof, to perform method 600 of FIG. 6. The memory 732 or the one or more components of the processor 706, the processors 710, the wireless controller 740, and/or the CODEC 734 may be a non-transitory computer-readable medium that includes instructions (e.g., the instructions 760) that, when executed by a computer (e.g., a processor in the CODEC 734, the processor 706, and/or the processors 710), cause the computer perform the method 600 FIG. 6.

Although the delay controller 202, the buffers 210, 220, 230, the decoders 212, 222, 232, and the spatial steering processor 240 are depicted as being inside the wireless controller 740, in other implementations, one or more of the buffers 210, 220, 230, the decoders 212, 222, 232, or spatial steering processor 240 may be inside of the CODEC 734, the processor 710, the one or more additional processors 706, or in another component of the mobile device 102.

In a particular implementation, the mobile device 102 may be included in a system-in-package or system-on-chip device 722, such as a mobile station modem (MSM). In a particular implementation, the processor 706, the processors 710, the display controller 726, the memory 732, the CODEC 734, and the wireless controller 740 are included in a system-in-package or the system-on-chip device 722. In a particular implementation, an input device 730, such as a touchscreen and/or keypad, and a power supply 744 are coupled to the system-on-chip device 722. Moreover, in a particular implementation, as illustrated in FIG. 7, the display 728, the input device 730, the speaker 736, the microphone 738, the antenna 742, and the power supply 744 are external to the system-on-chip device 722. However, each of the display 728, the input device 730, the speaker 738, the microphone 736, the antenna 742, and the power supply 744 can be coupled to a component of the system-on-chip device 722, such as an interface or a controller. In an illustrative example, the mobile device 102 corresponds to a mobile communication device, a smartphone, a cellular phone, a laptop computer, a computer, a tablet computer, a personal digital assistant, a display device, a television, a gaming console, a music player, a radio, a digital video player, an optical disc player, a tuner, a camera, a navigation device, a decoder system, an encoder system, or any combination thereof.

Although FIG. 7 depicts components of the mobile device 102, other devices described herein (e.g., the first device 110 of FIGS. 1A-1C, the second device 120 of FIGS. 1A-1C, and/or the third device 130 of FIGS. 1A-1C) may include similar components to those illustrated in FIG. 7 for the mobile device 102.

Additional implementations of the disclosure are presented herein in the form of an appendix. It is to be understood that such implementations may be utilized instead or, or in addition to, certain implementations illustrated and described with reference to FIGS. 1A-7.

In conjunction with the described implementations, an apparatus is disclosed that includes means for receiving a first audio stream from a first device associated with a first participant of a conference. For example, the means for receiving the first audio stream may include the first buffer 210 of FIGS. 2A-2B and 7, the wireless controller 740 of FIG. 7, one or more devices configured to receive the first audio stream (e.g., a processor executing instructions at a non-transitory computer readable storage medium), or any combination thereof.

The apparatus may also include means for receiving a second audio stream from a second device associated with a second participant of the conference. For example, the means for receiving the second audio stream may include the second buffer 220 of FIGS. 2A-2B and 7, the wireless controller 740 of FIG. 7, one or more devices configured to receive the second audio stream (e.g., a processor executing instructions at a non-transitory computer readable storage medium), or any combination thereof.

The apparatus may also include means for generating a control signal. The control signal may be provided to the means for receiving the first audio stream and to the means for receiving the second audio stream to synchronize first buffered audio that is output from the means for receiving the first audio stream with second buffered audio that is output from the means for receiving the second audio stream. For example, the means for generating the control signal may include the delay controller 202 of FIGS. 2A-2B and 7, the wireless controller 740 of FIG. 7, the processor 706 of FIG. 7, the one or more additional processors 710 of FIG. 7, one or more devices configured to generate the control signal (e.g., a processor executing instructions at a non-transitory computer readable storage medium), or any combination thereof.

Those of skill would further appreciate that the various illustrative logical blocks, configurations, modules, circuits, and algorithm steps described in connection with the implementations disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an ASIC. The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A mobile device for managing audio during a conference, the mobile device comprising:
    a first decoder configured to decode a first audio stream, based upon a determination to prioritize the first audio stream, from a first device associated with a first participant of the conference to generate a first decoded audio, the determination to prioritize the first audio stream being based upon a frame energy, or an active level;
    a second decoder configured to decode a second audio stream from a second device associated with a second participant of the conference to generate a second decoded audio;
    a spatial steering processor configured to:
        obtain user input of a user of the mobile device, the user input including a first user indication that the first participant associated with the first device is a preferred participant;
        responsive to the user input, (a) provide a control signal to a network device to adjust a first bit rate, in a manner indicated by user preference, of the first audio stream and (b) increase a first gain of the first decoded audio;
        steer the first decoded audio to be projected from a speaker at a first angle, the first angle based upon a second user indication of an angle at which audio is to be projected, the first decoded audio corresponding to a decoded version of the first audio stream from the first device;
        steer the second decoded audio to be projected from the speaker at a second angle, the second decoded audio corresponding to a decoded version of the second audio stream from a second device associated with a second participant of the conference, and the first decoded audio synchronized with the second decoded audio;
        receive a signal indicating detection of head movement associated with the user of the mobile device, wherein the user of the mobile device is distinct from the first participant and second participant; and
        shift the first angle and the second angle by a shift amount in response to receiving the signal; and
    the speaker configured to:
        project the first decoded audio at the shifted first angle; and project the second decoded audio at the shifted second angle.

2. The mobile device of claim 1, wherein the spatial steering processor is configured to:
select, based on determining that the first participant corresponds to the preferred participant, a first head-related transfer function (HRTF) for the first device, the first HRTF corresponding to the first angle and a first gain;
select, based on determining that the second participant does not correspond to the preferred participant, a second HRTF for the second device, the second HRTF corresponding to the second angle and a second gain, wherein the first gain is higher than the second gain;
apply the first HRTF to the first decoded audio to steer the first decoded audio; and
apply the second HRTF to the second decoded audio to steer the second decoded audio.

3. The mobile device of claim 1, further comprising:
a first de-jitter buffer configured to receive the first audio stream from the first device;
a second de-jitter buffer configured to receive the second audio stream from the second device; and
a delay controller configured to generate a control signal, the control signal provided to the first de-jitter buffer and to the second de-jitter buffer to synchronize first buffered audio that is outputted from the first de-jitter buffer with second buffered audio that is output from the second de-jitter buffer,
wherein the first decoded audio is synchronized with the second decoded audio based on the synchronization of the first buffered audio and the second buffered audio.

4. The mobile device of claim 3, wherein the delay controller is further configured to:
compare a first time stamp of the first audio stream with a second time stamp of the second audio stream, the first time stamp and the second time stamp based on a common clock source; and
determine a time difference between the first time stamp and the second time stamp.

5. The mobile device of claim 3, wherein the first buffered audio is synchronized with the second buffered audio prior to performing decoding operations to output a first signal associated with the first buffered audio and a second signal associated with the second buffered audio.

6. The mobile device of claim 4, wherein the control signal indicates to the first de-jitter buffer to delay outputting the first buffered audio by the time difference if the first time stamp indicates an earlier time than the second time stamp.

7. The mobile device of claim 4, wherein the control signal indicates to the second de-jitter buffer to delay outputting the second buffered audio by the time difference if the second time stamp indicates an earlier time than the first time stamp.

8. The mobile device of claim 1, further comprising an antenna configured to receive the first audio stream.

9. The mobile device of claim 1, further comprising a modem that includes the spatial steering processor.

10. The mobile device of claim 1, wherein the mobile device, the first device, and the second device each comprise a user equipment (UE) that is compatible with a Third Generation Partnership Project (3GPP) standard.

11. A method for managing audio during a conference, the method comprising:
decoding, at a first decoder of a mobile device, a first audio stream, based upon a determination to prioritize the first audio stream, received from a first device associated with a first participant of the conference to generate a first decoded audio, the determination to prioritize the first audio stream being based upon a frame energy or an active level;
decoding, at a second decoder of the mobile device, a second audio stream received from a second device associated with a second participant of the conference to generate a second decoded audio;
obtaining user input of a user of the mobile device, the user input including a first user indication that the first participant associated with the first device is a preferred participant;
responsive to the user input, (a) providing a control signal to a network device to adjust a first bit rate, in a manner indicated by user preference, of the first audio stream and (b) increasing a first gain of the first decoded audio;
steering, at a spatial steering processor, the first decoded audio to be projected from a speaker at a first angle, the first angle based upon a second user indication of an angle at which audio is to be projected, the first decoded audio corresponding to a decoded version of the first audio stream from the first device;
steering, at the spatial steering processor, the second decoded audio to be projected from the speaker at a second angle, the second decoded audio corresponding to a decoded version of the second audio stream from a second device associated with a second participant of the conference, and the first decoded audio synchronized with the second decoded audio;
receiving a signal indicating detection of head movement associated with the user of the mobile device, wherein the user of the mobile device is distinct from the first participant and second participant; and
shifting the first angle and the second angle by a shift amount in response to receiving the signal.

12. The method of claim 11, further comprising:
applying a first head-related transfer function (HRTF) to the first decoded audio to steer the first decoded audio; and
applying a second HRTF to the second decoded audio to steer the second decoded audio.

13. The method of claim 11, further comprising:
receiving, at a first buffer of the mobile device, the first audio stream from the first device;
receiving, at a second buffer of the mobile device, the second audio stream from the second device; and
generating a control signal at a delay controller for the mobile device, the control signal provided to the first buffer and to the second buffer to synchronize first buffered audio that is outputted from the first buffer with second buffered audio that is output from the second buffer,
wherein the first decoded audio is synchronized with the second decoded audio based on the synchronization of the first buffered audio and the second buffered audio.

14. The method of claim 13, further comprising:
comparing, at the mobile device, a first time stamp of the first audio stream with a second time stamp of the second audio stream, the first time stamp and the second time stamp based on a common clock source; and
determining, at the mobile device, a time difference between the first time stamp and the second time stamp.

15. The method of claim 13, wherein the first buffer comprises a first de-jitter buffer, and wherein the second buffer comprises a second de-jitter buffer.

16. The method of claim 14, wherein the control signal indicates to the first buffer to delay outputting the first buffered audio by the time difference if the first time stamp indicates an earlier time than the second time stamp.

17. The method of claim 14, wherein the control signal indicates to the second buffer to delay outputting the second buffered audio by the time difference if the second time stamp indicates an earlier time than the first time stamp.

18. The method of claim 11, wherein the mobile device, the first device, and the second device each comprise a user equipment (UE) that is compatible with a Third Generation Partnership Project (3GPP) standard.

19. The method of claim 11, wherein the first audio stream is received via an antenna of the mobile device.

20. The method of claim 11, wherein the spatial steering processor is included in a modem of the mobile device.

21. A non-transitory computer-readable medium comprising instructions for managing audio during a conference, the instructions, when executed by a spatial steering processor in a mobile device, cause the spatial steering processor to perform operations comprising:
  decoding, at a first decoder of a mobile device, a first audio stream, based upon a determination to prioritize the first audio stream, received from a first device associated with a first participant of the conference to generate a first decoded audio, the determination to prioritize the first audio stream being based upon a frame energy or an active level;
  decoding, at a second decoder of the mobile device, a second audio stream received from a second device associated with a second participant of the conference to generate a second decoded audio;
  obtaining user input of a user of the mobile device, the user input including a first user indication that the first participant associated with the first device is a preferred participant;
  responsive to the user input, (a) providing a control signal to a network device to adjust a first bit rate, in a manner indicated by user preference, of the first audio stream and (b) increasing a first gain of the first decoded audio;
  steering the first decoded audio to be projected from a speaker at a first angle, the first angle based upon a second user indication of an angle at which audio is to be projected, the first decoded audio corresponding to a decoded version of the first audio stream from the first device;
  steering the second decoded audio to be projected from the speaker at a second angle, the second decoded audio corresponding to a decoded version of the second audio stream from a second device associated with a second participant of the conference, and the first decoded audio synchronized with the second decoded audio; and
  receiving a signal indicating detection of head movement associated with the user of the mobile device, wherein the user of the mobile device is distinct from the first participant and second participant; and
  shifting the first angle and the second angle by a shift amount in response to receiving the signal.

22. The non-transitory computer-readable medium of claim 21, wherein the operations further comprise:
  applying a first head-related transfer function (HRTF) to the first decoded audio to steer the first decoded audio; and
  applying a second HRTF to the second decoded audio to steer the second decoded audio.

23. The non-transitory computer-readable medium of claim 21, wherein the mobile device, the first device, and the second device each comprise a user equipment (UE) that is compatible with a Third Generation Partnership Project (3GPP) standard.

24. An apparatus for managing audio during a conference, the apparatus comprising:
  means for decoding, at a first decoder of a mobile device, a first audio stream received from a first device, based upon a determination to prioritize the first audio stream, associated with a first participant of the conference to generate a first decoded audio, the determination to prioritize the first audio stream being based upon a frame energy or an active level;
  means for decoding, at a second decoder of the mobile device, a second audio stream received from a second device associated with a second participant of the conference to generate a second decoded audio;
  means for obtaining user input of a user of the mobile device, the user input including a first user indication that the first participant associated with the first device is a preferred participant;
  means for providing, responsive to the first user indication, a control signal to a network device to adjust a first bit rate, in a manner indicated by user preference, of the first audio stream based upon user preferences;
  means for increasing, responsive to the first user indication, a first gain of the first decoded audio;
  means for steering the first decoded audio to be projected from means for projecting at a first angle, the first angle based upon a second user indication of an angle at which audio is to be projected, and steering the second decoded audio to be projected from the means for projecting at a second angle, the first decoded audio corresponding to a decoded version of the first audio stream from the first device, the second decoded audio corresponding to a decoded version of the second audio stream from a second device associated with a second participant of the conference, and the first decoded audio synchronized with the second decoded audio;
  the means for projecting; and
  means for receiving a signal indicating detection of head movement associated with the user of the mobile device, wherein the user of the mobile device is distinct from the first participant and second participant; and
  means for shifting the first angle and the second angle by a shift amount in response to receiving the signal.

25. The apparatus of claim 24, wherein the means for steering the first decoded audio and the second decoded audio is included in a modem of a mobile device.

26. The apparatus of claim 25, wherein the first audio stream is received via an antenna of the mobile device.

* * * * *